United States Patent
Norton et al.

(10) Patent No.: US 7,552,134 B2
(45) Date of Patent: Jun. 23, 2009

(54) HOSTED ASSET INFORMATION MANAGEMENT SYSTEM AND METHOD

(75) Inventors: Phillip G. Norton, McLean, VA (US); Mindy I. Barton, Manassas, VA (US)

(73) Assignee: ePlus, Inc., Herndon, VA (US)

( * ) Notice: Subject to any disclaimer, the term of this patent is extended or adjusted under 35 U.S.C. 154(b) by 979 days.

(21) Appl. No.: 09/984,862

(22) Filed: Oct. 31, 2001

(65) Prior Publication Data

US 2002/0091699 A1    Jul. 11, 2002

Related U.S. Application Data

(60) Provisional application No. 60/244,916, filed on Nov. 2, 2000.

(51) Int. Cl.
*G06F 17/00* (2006.01)

(52) U.S. Cl. .................. 707/102; 707/100; 707/101

(58) Field of Classification Search ......... 707/100–102, 707/104.1, 3, 1
See application file for complete search history.

(56) References Cited

U.S. PATENT DOCUMENTS

| | | | |
|---|---|---|---|
| 4,135,241 A | 1/1979 | Stanis et al. | |
| 4,336,589 A | 6/1982 | Smith et al. | |
| 4,509,123 A | 4/1985 | Vereen | |
| 4,636,950 A | 1/1987 | Caswell et al. | |
| 4,656,591 A | 4/1987 | Goldberg | |
| 4,887,208 A | 12/1989 | Schneider et al. | |
| 4,920,488 A | 4/1990 | Filley | |
| 5,038,283 A | 8/1991 | Caveney | |
| 5,331,543 A | 7/1994 | Yajima et al. | |
| 5,706,506 A * | 1/1998 | Jensen et al. | 707/103 R |
| 5,752,244 A * | 5/1998 | Rose et al. | 707/5 |
| 6,633,875 B2 * | 10/2003 | Brady | 707/10 |
| 2001/0013004 A1 * | 8/2001 | Haris et al. | 705/1 |
| 2002/0032626 A1 * | 3/2002 | DeWolf et al. | 705/35 |
| 2002/0091541 A1 * | 7/2002 | Lundberg | 705/1 |

FOREIGN PATENT DOCUMENTS

WO    9011572    10/1990

* cited by examiner

*Primary Examiner*—Sana Al-Hashemi
(74) *Attorney, Agent, or Firm*—Cha & Reiter, LLC; Stephen Gigante; Noreen O'Hara-Welch

(57) ABSTRACT

A system and method for managing asset information is presented for both a standalone architecture and as a component of a total asset management system. The range of users for the system and method of the present invention spans single users to partners of a supply, chain and in the latter case, cross-organization asset detail information is provided to supply chain partners. The system and method of the present invention is intended to be interfaced with other components of a total asset management system, e.g., a procurement system for asset acquisition, and may be interfaced to legacy systems.

22 Claims, 31 Drawing Sheets

FIG. 7

| | Lease | Schedule | Model | Description | Tracking # | Serial |
|---|---|---|---|---|---|---|
| Details | EPLUS | DEMO | 220-3288 | LATITUDE CPIR400GT400MHZ | 799706679 | YSRX |
| Details | EPLUS | DEMO | 220-3085 | POWEREDGE 6300 WITH REDUNDANT | 789706680 | YSR6T |
| Details | EPLUS | DEMO | 320-6367 | P780 MONITOR 17" | 799706681 | 490833Y1DC |
| Details | EPLUS | DEMO | 320-6367 | P780 MONITOR 17" | 799706682 | 490833UHY3X |
| Details | EPLUS | DEMO | D7850E | VECTRA VL8 PII400MHZ | 799706683 | US1457HGY78 |

FIG. 8

| Qty | Manufacturer | Model Number | Description |
|---|---|---|---|
| 1 | DELL | HDD-10 | HARD DRIVE 10GB |
| 1 | DELL | RAM-128 | RAM 128MB |
| 1 | DELL | CDROM-24 | CDROM DRIVE 24X |
| 1 | MICROSOFT | WINDOWS NT | WINDOWS NT V4.0 |
|   |   |   | C-PORT VM/MONITOR |

| Lease | Schedule | Model | Description | Serial Num | Tracking ID | List Price | Cost | Maint Cost | Serial | Leased | Rent Ow |
|---|---|---|---|---|---|---|---|---|---|---|---|
| EPLUS | DEMO | 220-3286 | LATITUDE CPIR400GT 400MHZ | | 799706679 | 0.00 | 0.00 | 0.00 | YSR0X | ☑ | ☐ |
| EPLUS | DEMO | 220-3085 | POWEREDGE 6300 WITH REDUNDANT | | 799706680 | 0.00 | 0.00 | 0.00 | YSR6T | ☑ | ☐ |
| EPLUS | DEMO | 320-6367 | P780 MONITOR 17" | | 799706681 | 0.00 | 0.00 | 0.00 | 496833TY1DC | ☑ | ☐ |
| EPLUS | DEMO | 320-6367 | P780 MONITOR 17" | | 799706682 | 0.00 | 0.00 | 0.00 | 496834HY3X | ☑ | ☐ |
| EPLUS | DEMO | D7950E | VECTRA VL18 PIII400MHZ | | 799706683 | | | | US1457HGY78 | ☐ | ☐ |

FIG. 9

| | Lease | Schedule | Model | Description | Tracking # | Serial | Rent Ov |
|---|---|---|---|---|---|---|---|
| Details | EPLUS | DEMO | 220-3288 | LATITUDE CPIR4000GT4400MHZ | 79970679 | YSR0X | ☐ |
| Details | EPLUS | DEMO | 220-3085 | POWEREDGE 6300 WITH REDUNDANT | 79970680 | YSR6T | ☐ |
| Details | EPLUS | DEMO | 320-6357 | P780 MONITOR 17" | 79970681 | 49833TY1DC | ☐ |
| Details | EPLUS | DEMO | 320-6357 | P780 MONITOR 17" | 79970682 | 49833UHY3X | ☐ |
| Details | EPLUS | DEMO | D7950E | VECTRA VL18 PII400MHZ | 79970683 | US1457HGY78 | ☐ |

FIG. 12

| Date | Maintenance Description |
|---|---|
| 03/20/2000 | HARD DRIVE REPLACEMENT |

| | Lease | Schedule | Model | Description | Tracking # | Serial | Rent Out |
|---|---|---|---|---|---|---|---|
| Details | EPLUS | DEMO | 220-3286 | LATITUDE CPXR400GT/400MHZ | 79370679 | YSRDX | |
| Details | EPLUS | DEMO | 220-3335 | POWEREDGE 6300/1 WITH REDUNDANT | 79970680 | YSR6T | ☐ |
| Details | EPLUS | DEMO | 320-6367 | P780 MONITOR 17" | 79370681 | 43683TY1DC | ☐ |
| Details | EPLUS | DEMO | 320-6367 | P780 MONITOR 17" | 79970682 | 49803UHY3X | ☐ |
| Details | EPLUS | DEMO | D7950E | VECTRA VLI8 PIII/400MHZ | 79370683 | US1457HGY78 | |

FIG. 16

FOR A MASTER LEASE:

. PURCHASE ORDER
. COST CENTER
. PURCHASING AGENT
. INSTALLATION-BY LOC
. REBILL
. STATUS
. SOFT COST
. LEASESUMMARY
. TERMINATED

FIG. 17

EPLUS INC
Purchase Order Summary Report
Lease EPLUS

Date: 05/11/2000
Time: 12:49 PM

Page 1 of 2

| Qty | Manufacturer | Model | Description | Equipment Cost | Monthly Lease Payment |
|---|---|---|---|---|---|
| Purchase Order: (709)-31676521 | | | | | |
| 2 | DELL | 220-3286 | LATITUDE CPIR400GT/400MHZ | $4,077.58 | $158.17 |
| 1 | UNKNOWN | | L-MAINTENANCE ONE YEAR LAWN MAINTENANCE | $1,160.00 | $0.00 |
| 3 | Items for Purchase Order (709)-31676521 | | | $5,237.58 | $158.17 |
| Purchase Order: (727)-26587226 | | | | | |
| 2 | DELL | 220-3085 | POWEREDGE 6300 WITH REDUNDANT POWER | $15,174.88 | $588.91 |
| 2 | Items for Purchase Order (727)-26587226 | | | $15,174.88 | $588.91 |
| Purchase Order: (749)-31905608 | | | | | |
| 2 | DELL | 320-6367 | P780 MONITOR 17" | $325.00 | $12.61 |
| 2 | Items for Purchase Order (749)-31905608 | | | $325.00 | $12.61 |
| Purchase Order: (755)-31905608 | | | | | |
| 2 | DELL | 320-6367 | P780 MONITOR 17" | $325.00 | $12.61 |
| 2 | Items for Purchase Order (755)-31905608 | | | $325.00 | $12.61 |
| Purchase Order: 234-000129 | | | | | |
| 2 | HP | D7950E | VECTRA VL18 PIII/400MHZ | $2,082.47 | $81.63 |
| 2 | Items for Purchase Order 234-000129 | | | $2,082.47 | $81.63 |
| Purchase Order: 234-000185 | | | | | |
| 2 | HP | D2836A | M700 COLOR MONITOR 17" | $398.95 | $15.48 |
| 2 | Items for Purchase Order 234-000185 | | | $398.95 | $15.48 |

FIG. 18

EPLUS INC
Cost Center Summary Report
Date : 05/15/2000
Time : 1:49 PM
Lease EPLUS — 181 — 180 — 186 — 187 — 188 Page 1 of 1

| Qty | Manufacturer | Model | Description | Equipment Cost | Management Fee | Monthly Lease Payment |
|---|---|---|---|---|---|---|
| 182 | 183 | 184 | 185 | | | |

Cost Center:

| 1 | ZEBRA TECH | 5586BK05409 | WAX/RESIN 5586 SERIES 2.52X360' | $0.00 | $0.00 | $0.00 |
| 1 | ZEBRA TECH | 70940BLUE | POLYTRANS 3000 2"X1" LABEL (BLUE) | $0.00 | $0.00 | $0.00 |
| 1 | ZEBRA TECH | 70940GREEN | POLYTRANS 3000 2"X1" LABEL (GREEN) | $0.00 | $0.00 | $0.00 |
| 1 | ZEBRA TECH | 70940PINK | POLYTRANS 3000 2"X1" LABEL (PINK) | $0.00 | $0.00 | $0.00 |
| 1 | ZEBRA TECH | 70940YELLOW | POLYTRANS 3000 2"X1" LABEL (YELLOW) | $0.00 | $0.00 | $0.00 |
| 1 | ZEBRA TECH | T453-241-00000 | T-402 STANDARD THERMAL TRANSFER | $0.00 | $0.00 | $0.00 |

6 Items for Cost Center — $0.00 — $0.00 — $0.00

Cost Center: 0002

| 1 | DELL | 220-3286 | LATITUDE CPIR400GT/400MHZ | $2,038.79 | $0.00 | $79.09 |
| 1 | HP | D2638A | M700 COLOR MONITOR 17" | $199.48 | $0.00 | $7.74 |
| 1 | HP | D7950E | VECTRA VL18 PII/400MHZ | $1,041.24 | $0.00 | $40.82 |
| 1 | TOSHIBA | PAS403U-T2CN4 | SATELLITE 4030CDT P6/300MHZ | $1,133.14 | $0.00 | $44.23 |

4 Items for Cost Center 0002 — $4,412.64 — $0.00 — $171.87

Cost Center: 0004

| 1 | DELL | 220-3085 | POWEREDGE 6300 WITH REDUNDANT | $7,587.44 | $0.00 | $294.46 |
| 2 | DELL | 320-6307 | P780 MONITOR 17" | $325.00 | $0.00 | $12.61 |

3 Items for Cost Center 0004 — $7,912.44 — $0.00 — $307.07

Cost Center: 0005

Adobe Acrobat - [Status Report.pdf]

Date: 5/15/00
Time: 14:06:02

EPLUS INC
Status Report — 222
Lease EPLUS-DEMO Term 12/01/1999 - 03/01/2003

| PO # | Equipment Cost | Date Of Acceptance | Ship Date | Order Date | Partial Shipment |
|---|---|---|---|---|---|
| (709)-31676521 | $5,237. | /1999 | 1999 | 1999 | |
| (727)-26587226 | $10,174. | /19/1999 | /1999 | /1999 | |
| (749)-319056O8 | $325.00 | 11/29/1999 | 11/20/1999 | 11/14/1999 | |
| (755)-31905608 | $325.00 | 11/29/1999 | 11/25/1999 | 11/23/1999 | |
| 234-000129 | $2,082.47 | 09/25/1999 | 09/19/1999 | 09/10/1999 | |
| 234-000185 | $398.96 | 11/29/1999 | 11/05/1999 | 11/03/1999 | |
| 34240 | $91,722.90 | 10/09/1999 | 10/06/1999 | 09/25/1999 | |
| 34422 | $12,153.00 | 10/09/1999 | 10/05/1999 | 09/25/1999 | |
| 30.183.218.35 | $868.00 | 10/15/1999 | 10/07/1999 | 09/29/1999 | |
| NCC177-1 | $2,266.27 | 10/02/1999 | 09/28/1999 | 09/15/1999 | |
| NCC177-1 | $11,973.00 | 10/15/1999 | 10/07/1999 | 08/29/1999 | |
| NCM110-1 | $1,299.00 | 11/05/1999 | 10/30/1999 | 10/26/1999 | |
| VAC159-12 | $71,778.66 | 10/15/1999 | 10/10/1999 | 10/02/1999 | |
| VAC159-12 | $70,028.73 | 10/15/1999 | 10/10/1999 | 10/02/1999 | |
| VAC159-12 | $675.00 | 10/20/1999 | 11/17/1999 | 11/05/1999 | |
| VAC159-12 | $734.00 | 10/26/1999 | 10/19/1999 | 10/10/1999 | |
| VAC159-12 | $71,008.65 | 11/05/1999 | 10/30/1999 | 10/20/1999 | |
| VAC159-12 | $1,333.00 | 11/08/1999 | 11/06/1999 | 11/01/1999 | |

| Lease EPLUS-DEMO | Total: | $359,394.08 | Total PC's: | 2 | $2,381.47 |
|---|---|---|---|---|---|
| Total Laptops: | 2 | $6,343.85 | Total Printers: | 1 | $868.00 |
| Total Monitors: | 3 | $1,048.95 | Total Servers: | 4 | $131,023.78 |
| Total Soft Cost: | | $310.00 | Total Other: | 7 | $216,718.03 |

Page 1 of 1

FIG. 23

| Cost Center | PO # | Bill Code | Maint | Install | Freight | Software | Accessory | Soft Total | Install City | State | County |
|---|---|---|---|---|---|---|---|---|---|---|---|
| 0002 | (709)-31676521 | 350-0117 | $0.00 | $0.00 | $0.00 | $0.00 | $0.00 | $0.00 | HERNDON | VA | FAIRFAX |
| 0002 | 234-0800129 | | | | | | | | | VA | FAIRFAX |
| 0002 | 234-0800185 | ASSET MANAGEM | | | | | | | | VA | FAIRFAX |
| 0002 | NCC177-1 | | | | | $198.27 | | $198.27 | HERNDON | VA | FAIRFAX |
| 0004 | (727)-28587226 | 061-0081 | $0.00 | $0.00 | $0.00 | $99.00 | $0.00 | $99.00 | HERNDON | VA | FAIRFAX |
| 0004 | (749)-31905608 | 030-0767 | $0.00 | $0.00 | $0.00 | $0.00 | $0.00 | $0.00 | HERNDON | VA | FAIRFAX |
| 0004 | (756)-31905608 | 930-0996 | $0.00 | $0.00 | $0.00 | $0.00 | $0.00 | $0.00 | HERNDON | VA | FAIRFAX |
| 0005 | 34122 | | | | | $300.00 | | $300.00 | HERNDON | VA | FAIRFAX |
| 0075 | N3M119-1 | FINANCE | | | | $0.00 | | $0.00 | HERNDON | VA | FAIRFAX |
| 499 | 34240 | | | | | $25,441.00 | | $25,441.00 | HERNDON | VA | FAIRFAX |
| ACCOUNTING | (727)-26587226 | 061-0081 | $0.00 | $0.00 | $0.00 | $99.00 | $0.00 | $99.00 | HERNDON | VA | FAIRFAX |
| ACCOUNTING | (755)-31905608 | 930-0996 | $0.00 | $0.00 | $0.00 | $0.00 | $0.00 | $0.00 | HERNDON | VA | FAIRFAX |
| ACCOUNTING | VAC153-12 | HANLON OFFICE | $0.00 | $310.00 | $0.00 | $0.00 | $0.00 | $310.00 | HERNDON | VA | FAIRFAX |
| ASSET MANAGEMENT | (709)-31676521 | 350-0117 | $0.00 | $0.00 | $0.00 | $0.00 | $0.00 | $0.00 | HERNDON | VA | FAIRFAX |
| ASSET MANAGEMENT | (749)-31905608 | 030-0767 | $0.00 | $0.00 | $0.00 | $0.00 | $0.00 | $0.00 | HERNDON | VA | FAIRFAX |
| ASSET MANAGEMENT | 234-0800129 | | | | | | | | | VA | FAIRFAX |
| ASSET MANAGEMENT | 234-0800185 | ASSET MANAGEM | | | | $306.57 | | $306.57 | HERNDON | VA | FAIRFAX |
| ASSET MANAGEMENT | NCC177-1 | | | | | $198.27 | | $198.27 | HERNDON | VA | FAIRFAX |
| COMPTROLLER | VAC159-12 | HERNDON | $0.00 | $25.00 | $0.00 | $0.00 | $0.00 | $25.00 | HERNDON | VA | FAIRFAX |
| CONTRACTS | VAC159-12 | | $0.00 | $1,555.00 | $0.00 | $0.00 | $0.00 | $1,555.00 | HERNDON | VA | FAIRFAX |
| FEDERAL | 38,183,216.35 | HERNDON | $0.00 | $0.00 | $0.00 | $0.00 | $0.00 | $0.00 | HERNDON | VA | FAIRFAX |
| FEDERAL | VAC159-12 | | $0.00 | $1,700.00 | $625.00 | $0.00 | $0.00 | $2,325.00 | HERNDON | VA | FAIRFAX |

FIG. 24

Friday, Aug 25, 2000     Customer Lease Summary Report     1:11 PM

Lease Number: 1011
Schedule Number: 1    Term: 36    Acceptance Date:
Schedule Date: 09/01/1997    Payment Frequency: Quarterly
    Lease End Date: 09/01/2000

MASTER LEASE INFORMATION

Lessee: HITACHI AMERICA LTD
Addr1: 2000 SIERRA POINT PARKWAY
Addr2:
City, State, Zip: BRISBANE, CA 94005
County: SAN MATEO
Attention: PATRICIA GORDAN
Title: PURCHASING MANAGER
Phone:

INSTALL LOCATION

Company: HITACHI AMERICA LTD
Addr1: 2000 SIERRA POINT PARKWAY
Addr2:
City, State, Zip: BRISBANE, CA 94005
County: SAN MATEO
Attention:
Title:
Phone:

BILLING LOCATION

Company: HITACHI AMERICA LTD
Addr1: 2000 SIERRA POINT PARKWAY
Addr2:
City, State, Zip: BRISBANE, CA 94005
County: SAN MATEO
Attention:
Title:
Phone:

FINANCIAL INFORMATION

Total Items: 12

Lease Rate Factor - Hard Costs: 0.0277685
Lease Rate Factor - Soft Costs: 0
Quarterly Equipment Rent: 19,517.37

HOSTED ASSET INFORMATION MANAGEMENT SYSTEM AND METHOD

CROSS REFERENCE TO RELATED APPLICATION

This is a non-provisional application claiming the benefit of provisional application No. 60/244,916 filed on Nov. 2, 2000, the entire disclosure of which is hereby incorporated by reference.

BACKGROUND OF THE INVENTION

1. Field of the Invention

The present invention relates to the field of asset information management for supply chains of partner organizations. In such a supply chain, as the individual partners acquire, finance, and service assets from one another, these assets are both used and transformed into other assets which may travel further in the supply chain. Information about these assets can be captured in a data store whenever individual asset-related transactions between partners are facilitated by an asset management system. Asset information in such a data store replaces physical inventory as the means of most competitively satisfying customer demand.

More particularly, the present invention is directed to an independent Internet accessible and web-based system and method for a hosted system that manages access to and reporting of supply chain asset information.

2. Discussion of the Prior Art

Supply chain systems and asset information management systems are known in the art. These known systems employ a range of architectures, including, tightly coupled dedicated database systems and federated independent database systems to manage and share their asset information. But, regardless of the architecture of the database component of these systems, the asset information management functions of these existing supply chain systems are tightly coupled to other functions, such as procurement, sales, and accounting and the focus of existing systems has been to reflect the characteristics of physical inventory.

Taking an independent view of the information systems for managing assets across a supply chain, such systems must provide access to a broad spectrum of supply chain asset information to enable partner organizations who participate in the supply chain to manage their businesses and not just their own assets. Asset information systems have historically been directed to capturing and reporting information about such activities as purchasing, installation, leases, status, etc., with respect to the inventory of an organization's assets. Today, any information necessary for the management of a business is a candidate for inclusion in an asset information system, especially information about how these assets appear as they travel in their chains of suppliers. The range of asset information needed to manage an organization's business is considerably broader than an information about the organization's individual inventory of assets.

The suppliers and purchasers of assets participate as partners in many supply chains, each possibly as functionally broad as the range extending from raw material providers, to intermediate component manufacturers, to assemblers, to vendors, to trainers, to deliverers, to maintainers, to financers, and to remarketers. These functions are not necessarily all performed by different partners. Viewed from this perspective, these partners form an extended enterprise. This extended enterprise is linked by the asset information about their products and services as these products and services and information about them traverse possibly multiple supply chains, as well as subsequently as data to be mined for historical trends. Global data models and standard data management functionality form the foundation for the asset information management required by participants in such an extended enterprise. What is usually available is a conglomeration of different levels of detail and summary data created and stored to meet the specific needs of individual organizations and independent supply chains.

Most partners in supply chains also have functionally-oriented legacy systems for managing their businesses and their asset information. Few have historically provided external partners access to these internal systems and their information stores. This is true for independent businesses participating in a supply chain and it is just as true for vertically integrated businesses where different departments and divisions function in much the same manner as independent businesses, due to their cost center orientation.

These functionally specific internal legacy systems have evolved as either loosely or tightly coupled with asset information and asset management components. The architecture of such legacy asset management components varies from one system to the next but is ill-suited to electronic linking over the Internet, a requirement resulting from more and more demand being placed on participants to provide their partners in chains of suppliers with web-based access to their private asset information (for assets traversing the supply chain). Access to asset information and functions is needed by partners to enhance each partner's management of its business, e.g., to support contract, payable, and order management by each partner. For example, a partner who supplies raw materials has an aged inventory of such materials over time derived from purchases of raw materials from sources in anticipation of demand from partners and accounts payable resulting from these purchases; contracts with both sources and supply chain partners, and orders resulting from these contracts; etc. Access to partner information is needed by such a supply chain partner to manage contracts, orders, and payables and as well as to verify orders.

Externally, asset information management is expanding to include non-asset as well as asset information about supply chain partners and has grown in importance as more of each partner's success depends on this information, so much so, that functions such as inventory pipeline management and accounting are now subsidiary functions of asset management. The chain of suppliers involved in producing, financing, delivering and maintaining assets, i.e., the external extended enterprise, and the supply process itself are now the focal points of expanded asset management systems in which information has replaced inventory. Predictably, functionally oriented legacy systems cannot easily be changed to reflect this reordering of importance of functions or the shift to an external extended enterprise focus for the supply chain process. And in fact, existing internal systems have not accommodated this shift in focus. Internal legacy systems are almost never available to other supply chain partners because they include information that an organization does not want to share or make public, these systems were never intended to be externally accessible and are not sufficiently robust, and retrofitting such systems is either not economically attractive or not technically feasible, or both.

The extended enterprise exists by virtue of the Internet. The Internet has enabled business-to-business interaction and formation of relationships to take place at unprecedented speed and with incredible visibility. Maintaining this form of business interaction will require an ever-increasing and unprecedented level of information intimacy, currency, and reliability which most individual businesses are ill-prepared to undertake on their own.

Thus, there is a need for a reliable Internet-accessible system and a method to support management of assets across organizations and well as within them, a system and method which emphasize the asset information intensity and extended enterprise characteristics of Internet-based supply chains which extend across multiple enterprises and which intersect.

SUMMARY OF THE INVENTION

The system and method according to the present invention are a hosted response to the need for an Internet-accessible asset information management system identified above. This hosted system is meant to be both a standalone asset information system, illustrated in FIG. 1a, as well as a component of a total asset management system, illustrated in FIG. 1b, a component that provides the information management dimension for supply chain partners to manage their businesses by leveraging their supply chain participation.

The hosted asset information system of the present invention is functionally and informationally architected to be open. As supply chain partners gain experience and grow comfortable with asset information accessability and reliability, the system and method of the current invention are architected to be able to expand to encompass more and more functions and data once held exclusively within the confines of each partner's organization, e.g., contract terms, and price controls.

The hosted asset information management system of the present invention provides cross-organization asset detail information; asset location, contact and maintenance information; invoice, financial, and charge back information; and other information needed by supply chain partners to manage their participation in a supply chain. Such information is created, stored, accessed and updated in a standard way regardless of the source or user of the information. In the hosted approach of the present invention, not only are uniform data storage and access techniques imposed, but integrity, reliability and accessibility are also inherent in the system and method according to the present invention.

One preferred embodiment of the present invention provides a range of asset information reports which can be viewed, printed and downloaded either in report format or a format suitable for input to legacy systems (manual or automated). These comprehensive report and download features include, among others, purchase order, cost center, purchasing agent, installation, rebilling, status, soft costs lease summary and termination reports and files which are selected and customized from a web-page interface.

The present invention enables supply chain partners (which includes customers) to leverage information about their products, services, and assets by, among others:

Converting existing asset information practices to Internet processes;

Replacing inventory with information;

Creating a standardized, reliable, accessible repository of asset information across the extended enterprise;

Providing many partners with access to asset information management functionality not previously available to them due to resource constraints;

Guaranteeing the integrity of the information store;

Delivering business intelligence in a format that can be interfaced with legacy systems; and Reducing administrative costs.

All of these effects create immediate cost savings and result in long-term efficiencies.

BRIEF DESCRIPTION OF THE DRAWINGS

A more complete understanding of these advantages and other advantages of the present invention may be acquired by referring to the following description taken in conjunction with the accompanying drawings, in which like reference numbers indicate like features and wherein:

FIG. 1b is a block diagram of a comprehensive asset management system which interfaces with a hosted asset management system, including the asset information management system according to a preferred embodiment of the present invention illustrated in FIG. 1a.

FIG. 7 is an exemplary display resulting from the selection of the Asset Tab.

FIG. 8 is an exemplary display resulting from the selection of the Option Tab.

FIG. 9 is an exemplary display resulting from the selection of the Location Tab.

FIG. 12 is an exemplary display resulting from the selection of the Maintenance Tab.

FIG. 16 an exemplary range of reports available.

FIG. 17 is an exemplary Purchase Order Report in summary format.

FIG. 18 is an exemplary Cost Center Report in summary format.

FIG. 21 is an exemplary Rebill Report.

FIG. 22 is an exemplary Status Report.

FIG. 23 is an exemplary Soft Cost Report.

FIG. 24 is an exemplary Lease Summary Report.

DETAILED DESCRIPTION OF THE INVENTION

The present invention provides an Internet-based hosted system and method for accessing and reporting on the asset information associated with an extended enterprise of supply chain partners. The asset information is captured by other systems and accessed by the system and method of the present invention.

Figure 1A:
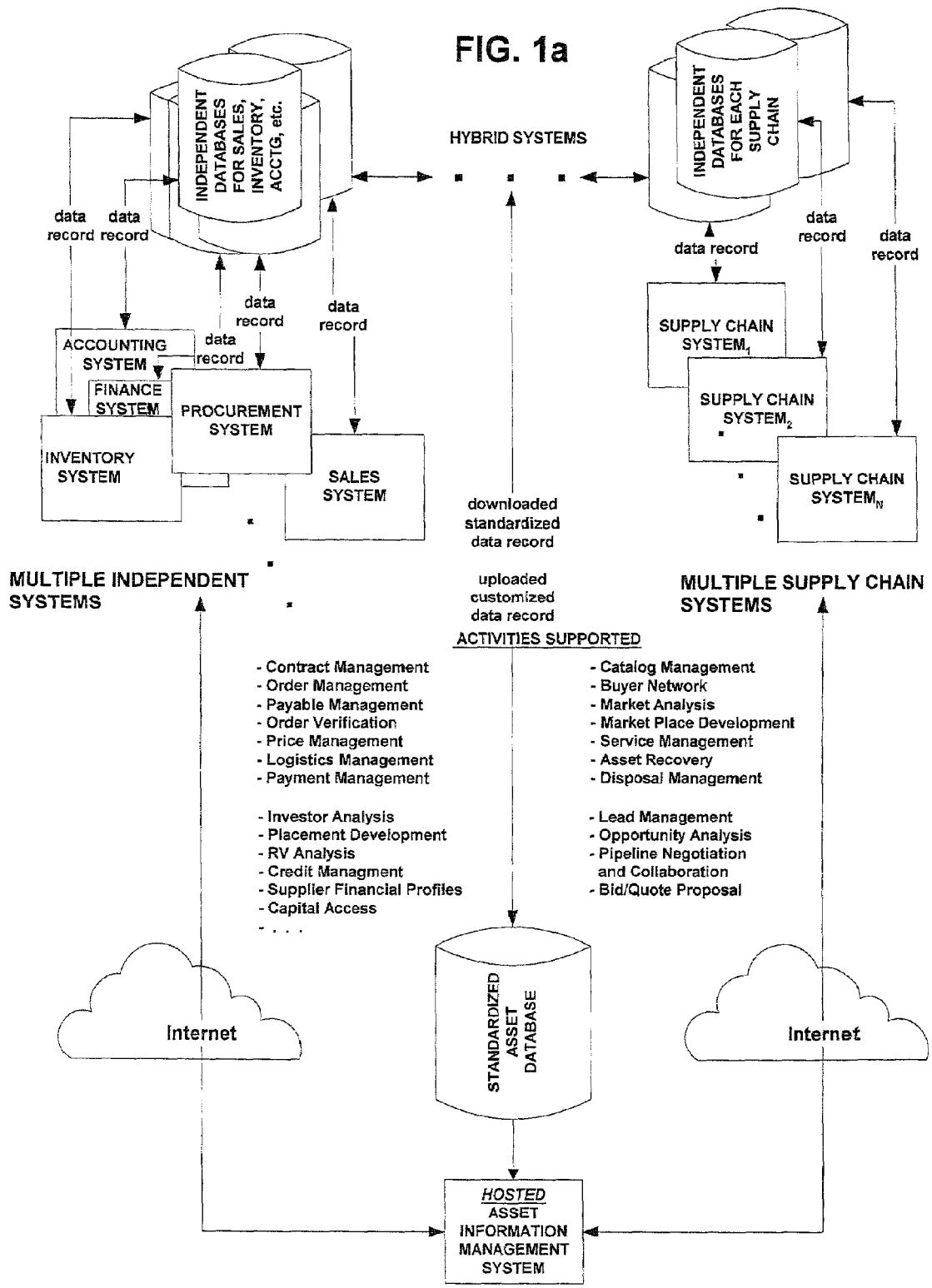
FIG. 1a is a block diagram of one preferred embodiment of a hosted asset information management system according to the present invention as a standalone system.
Figure 1B:
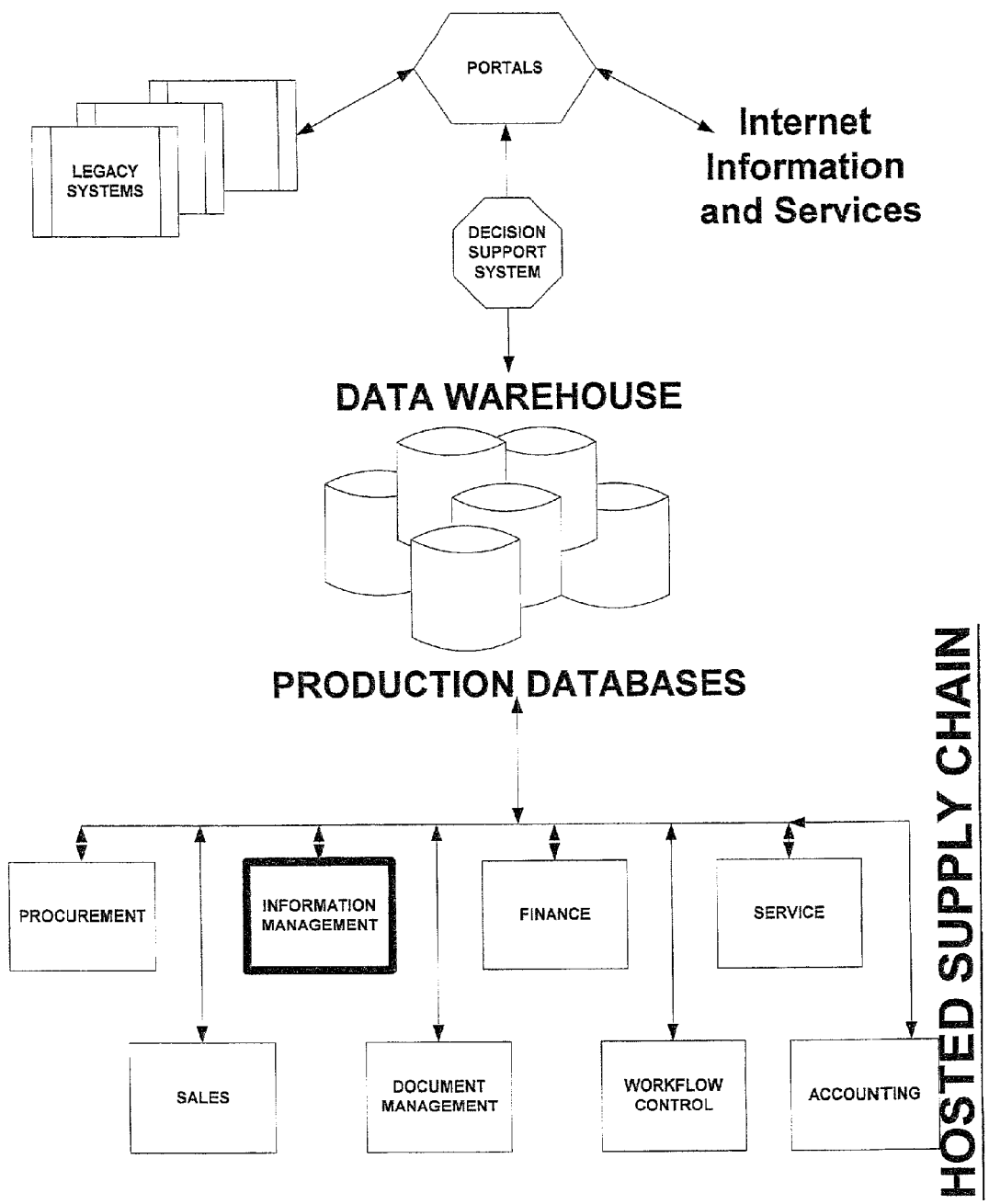
Figure 2:
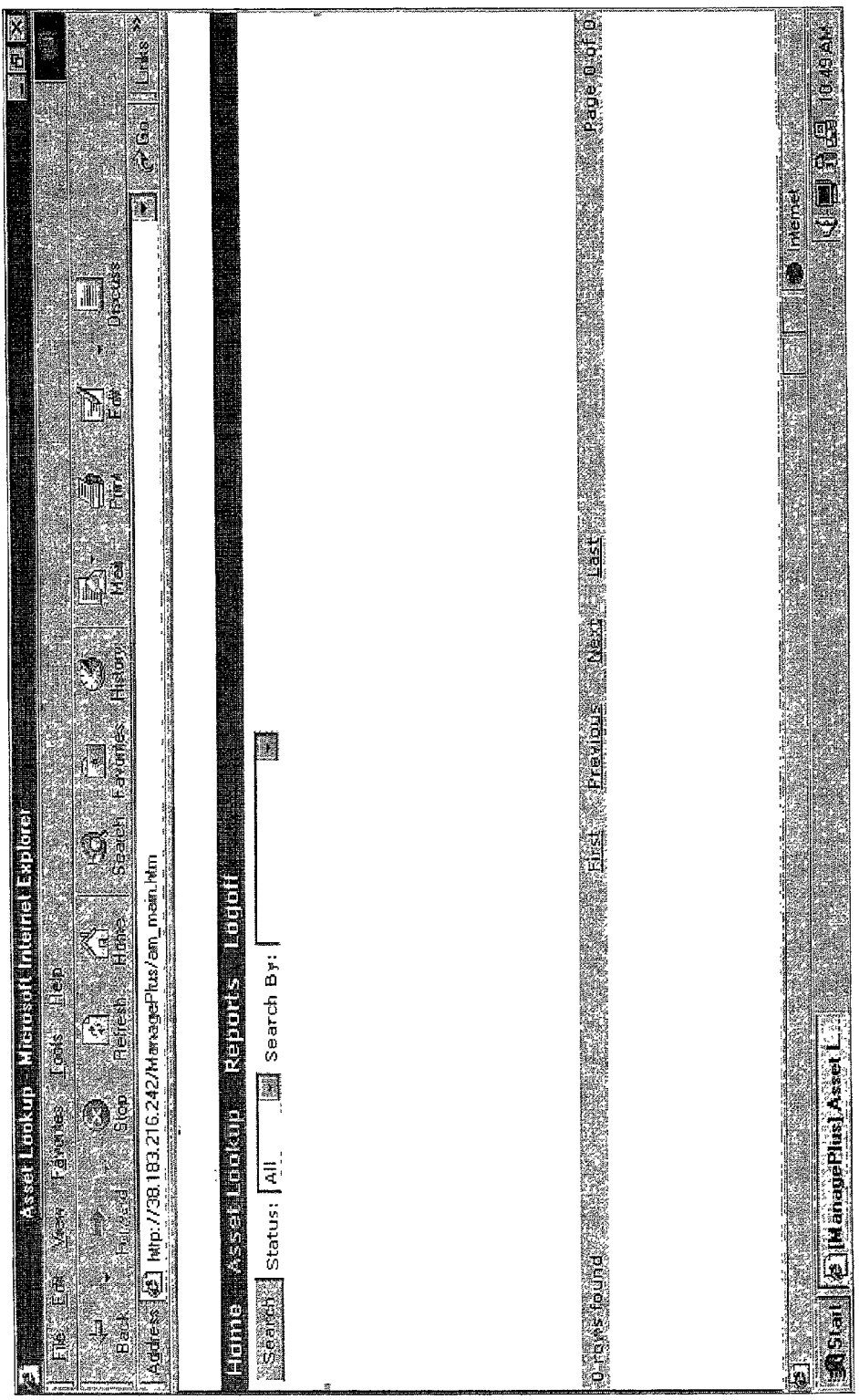
FIG. 2 is an exemplary Asset Information Screen.
Figure 4:
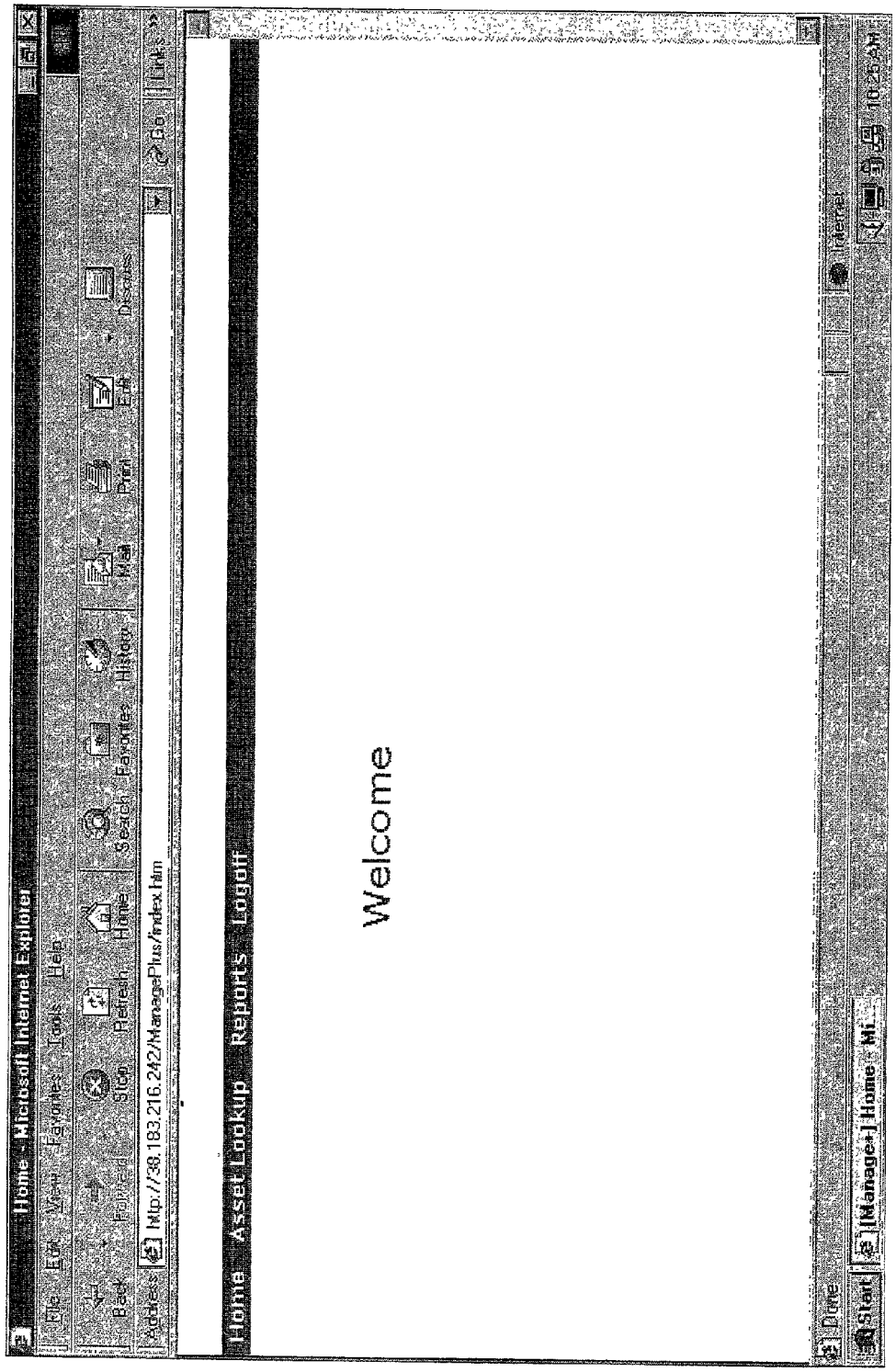
FIG. 4 is an exemplary main menu bar.

In one preferred embodiment, the asset information is captured in a relational asset information database by other independent systems, such as the procurement system illustrated in FIG. 1c. In this preferred embodiment, two open classes of functions are provided for viewing, reporting, and downloading this database data: asset lookup and asset report/download. In this preferred embodiment, a user is presented with a Home web-page containing a main menu bar, as illustrated in FIG. 4, which contains:

Home,
Asset Lookup,
Reports, and
Logoff as selection options.

ASSET DATABASE

When a customer procures an asset, that asset is placed onto a schedule. Depending on the business rules associated with that customer, the schedule may close with each item procured or may remain open for inclusion of additional items until some predefined closing condition is met. During the period in which a schedule remains open, it is billed on a daily basis for any outstanding items. Once the schedule is closed, no further items may be added to it and billing takes place on a periodic basis, usually monthly. During the time the asset remains in the possession of the customer, there will be other charges which are associated with the asset, e.g., maintenance and options. Further, the asset will be physically located at a location and possibly associated with a cost center. Asset detail and ancillary information, such as the forgoing, is managed by the hosted system and method of the present invention.

In one preferred embodiment, asset information associated with both schedules and other activities is captured in a relational database, as shown-in the database schema of FIGS. 27a-d. This data capture is not accomplished by the system and method of the present invention but by another, independent data producer, such as a procurement system. The database schema, illustrated in FIGS. 27a-d, contains three types of relations or tables: constant tables, working tables, and cross-reference tables. Each table illustrated in FIGS. 27a-d, contains a list indicating column name, data type and size, and whether or not the field can be empty (null). An underlined column name indicates that the data is so frequently used in searches of the table that it has been called out in an index. For example, the vendor table 271 has an index of:

vend num NUMBER(12) not null

A table can have separate indexes, i.e., several columns can individually be indexed, as shown for the tax_rate table 275.

The database schema of the preferred embodiment, illustrated in FIGS. 27a-d, is one means by which the asset information management system of the present invention can be hosted independently of any other independent systems that populate a database according to this schema. Thus, this database schema of the preferred embodiment functions as an interface specification for the preferred embodiment of the present invention.

Constant Tables

In one preferred embodiment, constant tables contain information that changes very slowly and represents data infrastructure. This data is assigned unique identifiers which are used by working tables in place of the constant so that space is saved by not storing the constants wherever they are needed in the working tables, and processing time is saved by only having to update a constant in one location (in the constant table) instead of having to update every table in which the constant appears.

Examples of constant tables include:
contact 270;
vendor 271;
mfg 272;
location 273; and
product 274.

Working Tables

In one preferred embodiment, data which is actively updated is contained in working tables, e.g., the item table 276. Entries in working tables are automatically assigned a unique identifier, such as seq_num 277 in the item table 276.

Cross-Reference Tables

Figure 27A:
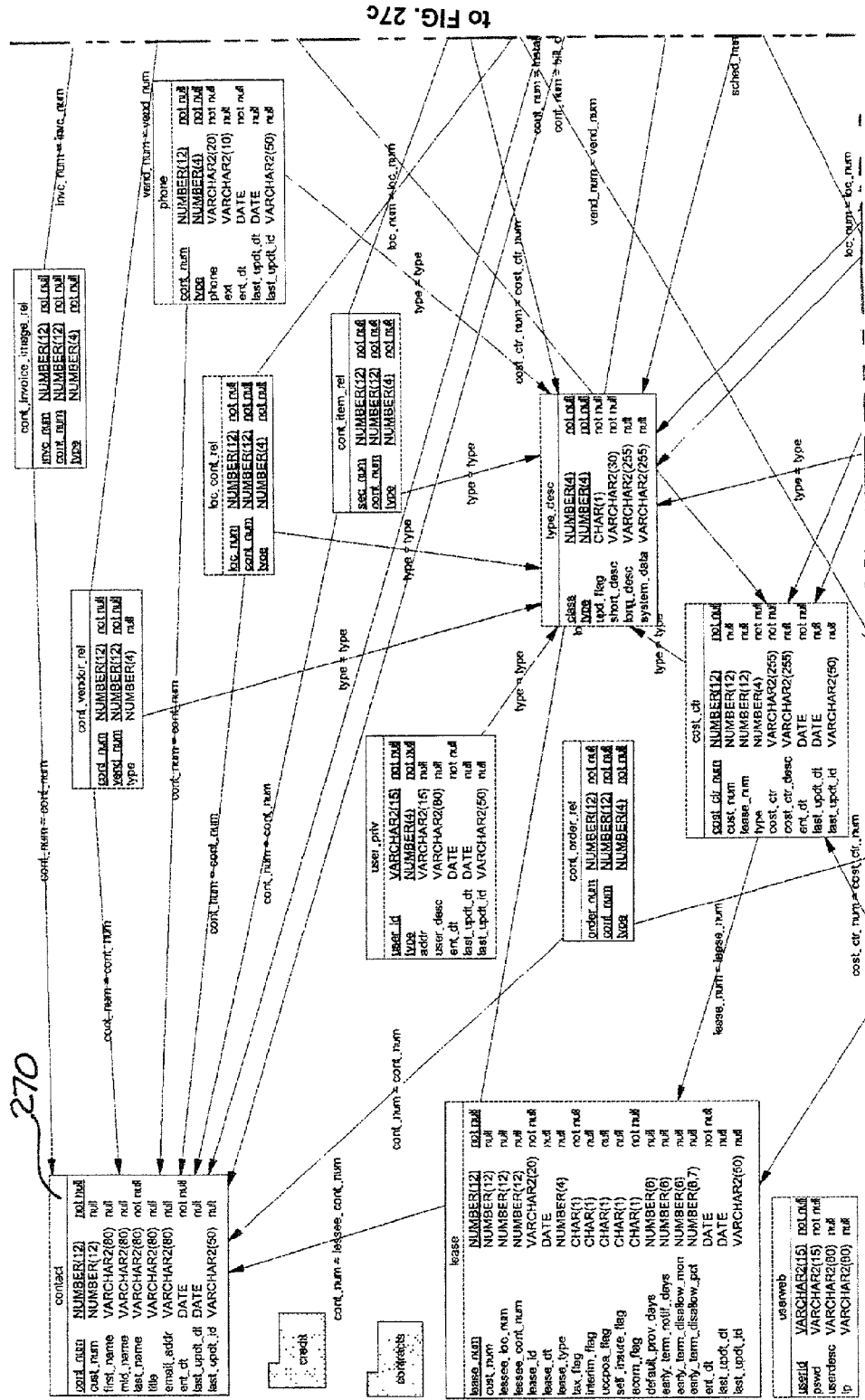
FIGS. 27a-d is a schema for a relational database of a preferred embodiment.
Figure 27B:
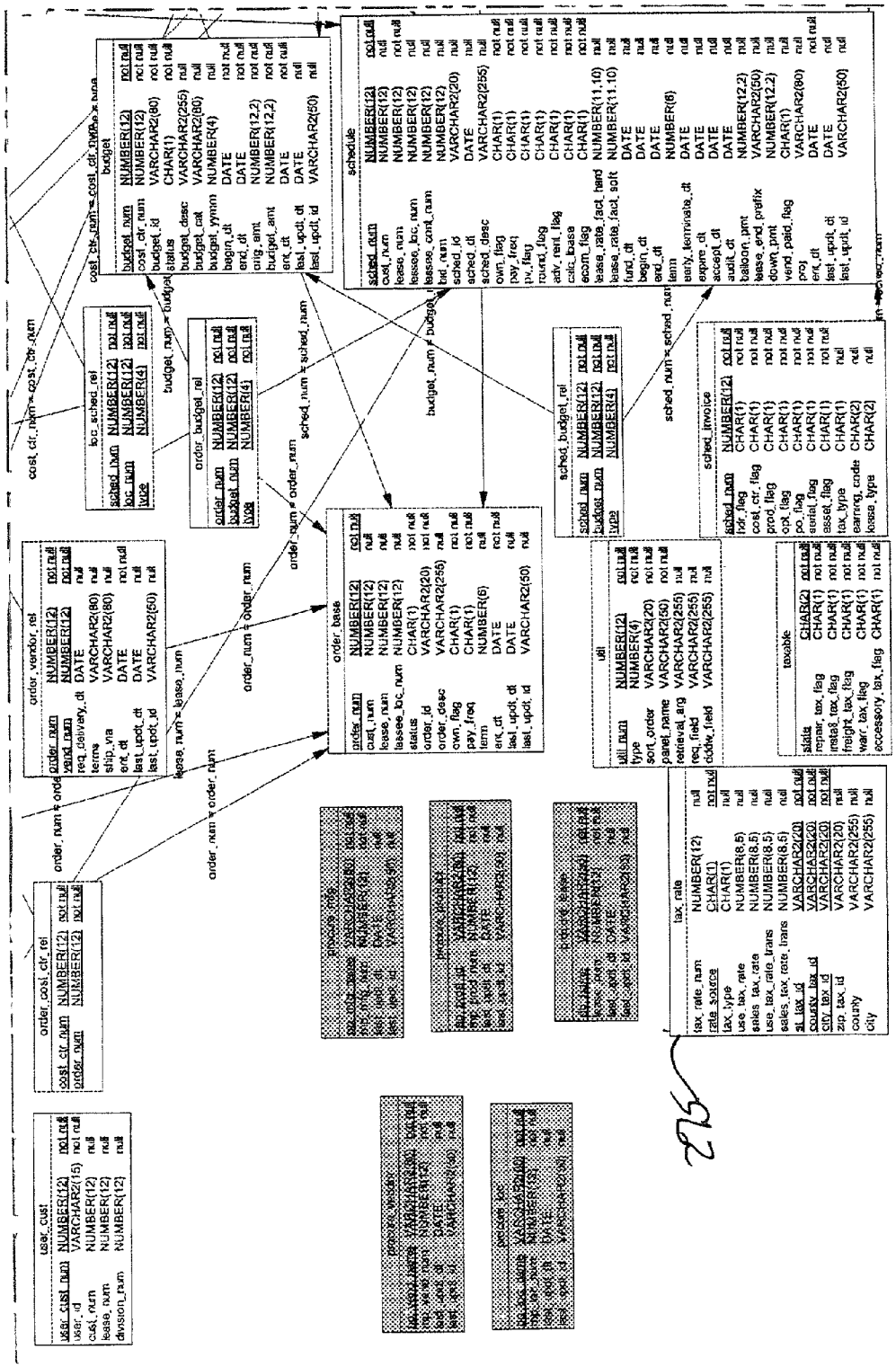
Figure 27C:
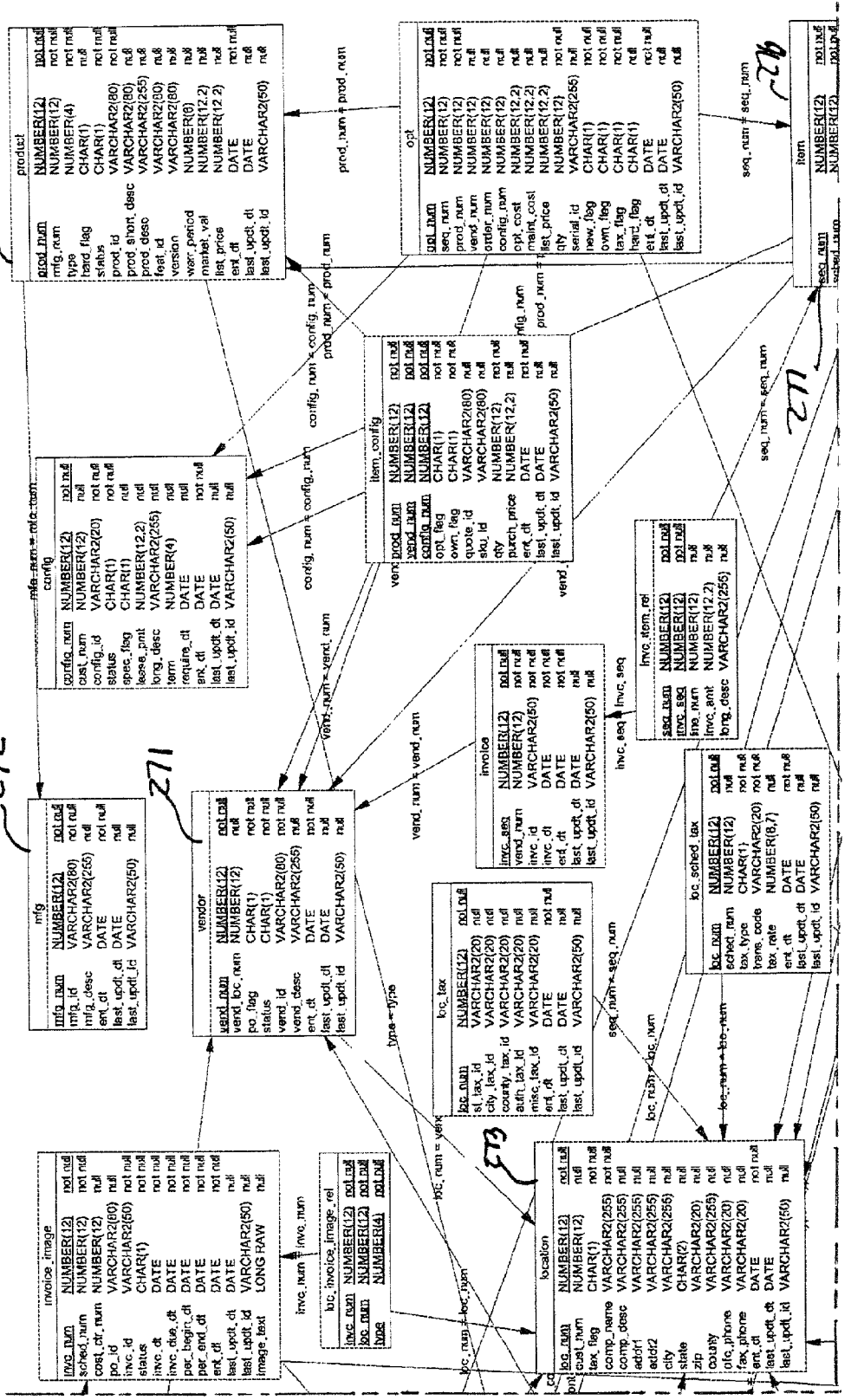
Figure 27D:
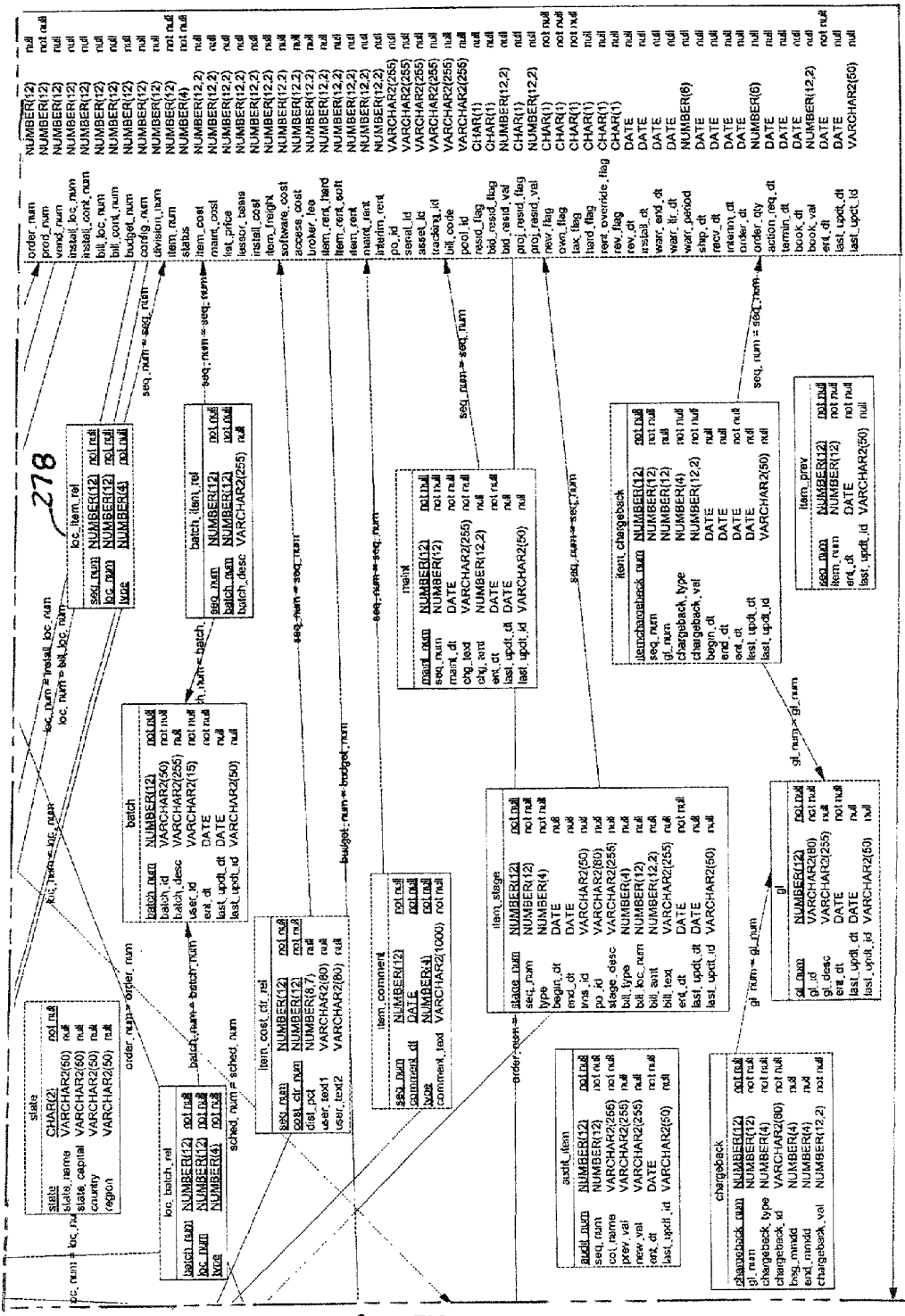

Cross-reference tables identify records in two or more tables that have some relationship. For example, as illustrated in FIG. 27b, the loc_item_rel table 278 contains pairs of unique identifiers for items (seq_num) and the location of that item (loc_num) in the item table 276 and the location table 273.

Asset Lookup

Figure 5:
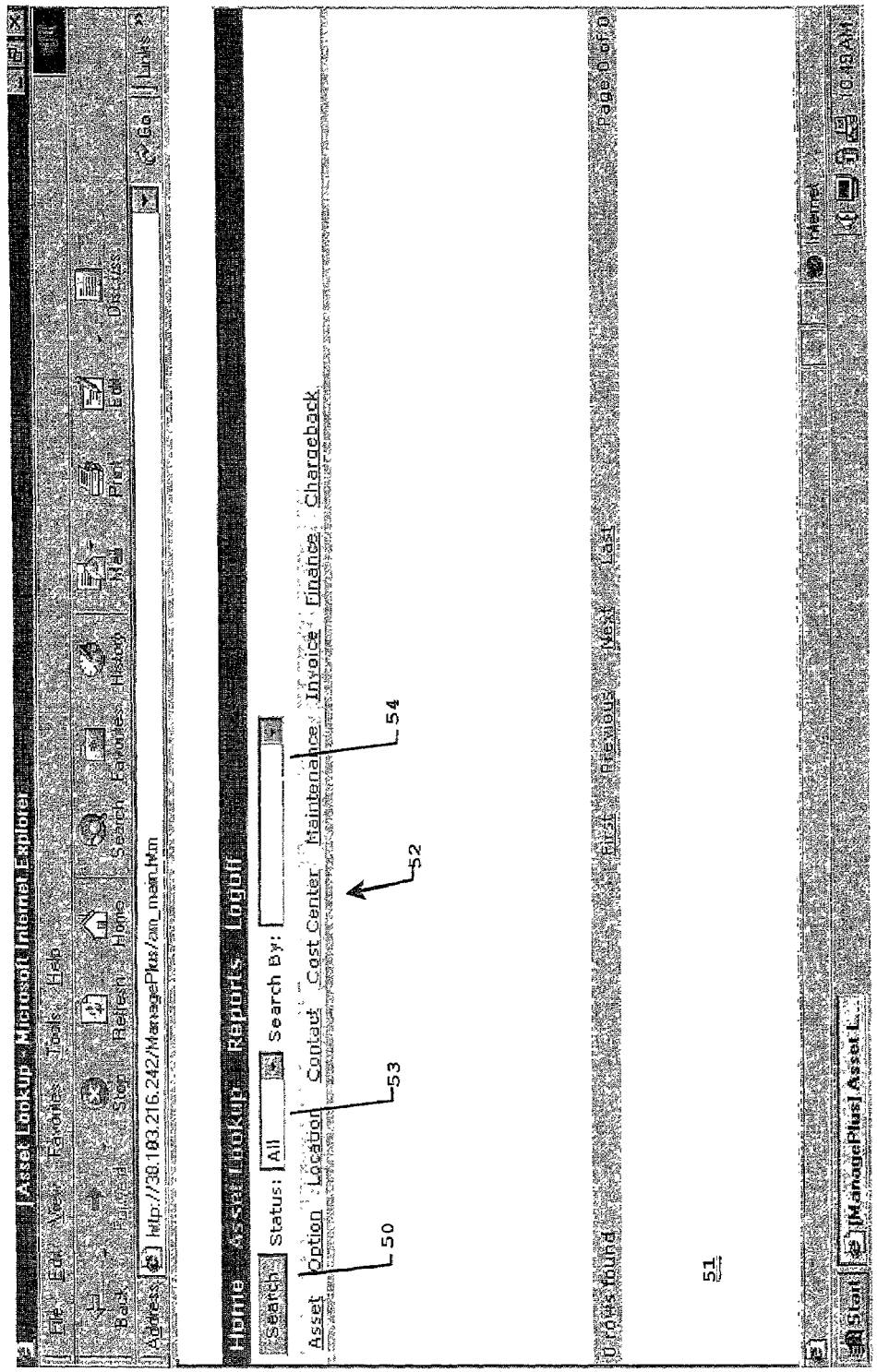
FIG. 5 is an illustration of the Asset Lookup function in the Asset Information screen according to an embodiment of the present invention.

In the preferred embodiment, selecting Asset Lookup from the main menu bar causes the display of the Asset Information Screen, illustrated in FIG. 5. The Asset Information Screen is the central screen of the Asset Lookup feature of the present invention, providing functionality which allows a user to search for an asset and then view a range of detailed information about the asset.

The Asset Information Screen comprises the Search feature 50, which is at the top of the screen in a preferred embodiment; tabs 52 in the top half of this screen to be used to display detailed information about the selected asset; and, in the bottom half 51 of the screen, the result of the user search from which an asset is selected to be viewed.

Search Options and Fields

SEARCH—The Search feature 50 is contained in the top half of the screen in a preferred embodiment. The Search feature searches the asset information, which is maintained in a database in a preferred embodiment, for the assets that match the criteria entered in the Status 53 and Search By 54 fields. In a preferred embodiment the results of the search appear in a list of assets in the bottom half of the screen.

STATUS—The user is able to limit the asset records displayed in the bottom half of the screen by entering the status of assets to be displayed. The Status field 53 displays the complete list of available asset status, which, in a preferred embodiment are All, Pending, Active, Inactive and are presented in a drop-down list.

1. All is the option which displays all assets regardless of the status of the schedule the asset is attached to.
2. Pending is the option which displays assets of a pending schedule. A pending schedule is a current schedule that has not been activated. A schedule is pending during the acquisition period prior to the start date of the schedule. During this acquisition period asset information is subject to change as the system according to the present invention populates the database of the preferred embodiment with appropriate asset information of the schedule.
3. Active is the option which displays assets of an active schedule. An active schedule is a current schedule that has been activated. A schedule is activated when the start date of the schedule is reached, and a schedule remains active until the end date of the schedule.

4. Inactive is the option which displays assets of an inactive schedule. An inactive schedule is a schedule that is no longer active, because the schedule end date has passed.

SEARCH BY—Status displays the complete list of asset search options. Depending on the Search By option 54 selected, additional value fields appear prompting the user to enter a value for the selected Search By option. Additional values for a preferred embodiment are shown in Table 1.

TABLE 1

| SEARCH CRITERION | VALUE (S) TO BE ENTERED |
| --- | --- |
| Lease/Schedule | Select the required schedule from the Schedule drop-down menu. |
| Model Number | Select the required manufacturer and model number from the Manufacturer and Model drop-down menus. |
| Serial Number | Enter the required serial number in the Serial Number field. |
| Billing Code | Select required billing code from the Billing Code drop-down menu. |
| Location | Select the required location type from the Type drop-down menu, then enter the location name in the Name field. |
| Contact | Select the required contact type from the Type drop-down menu, then enter a contact name in the Name field. |
| PO Number | Enter the required purchase order number in the PO Number field. |
| Tracking ID | Enter the required tracking ID in the Tracking ID field. |
| Vendor | Select a vendor from the Vendor drop-down menu. |
| Cost Ctr/Dept | Select a cost center type from the Type drop-down menu, then select a cost center from the Name drop-down menu. |
| Option - Model # | Select the required manufacturer and model number from the Manufacturer and Model drop-down menus. |
| Option - Serial # | Enter the required serial number in the Serial Number field. |
| Option - Track ID | Enter the required tracking ID in the Tracking ID field. |
| Invoice Number | Enter the required invoice number in the Invoice # field. |

Tab Descriptions

Figure 6:
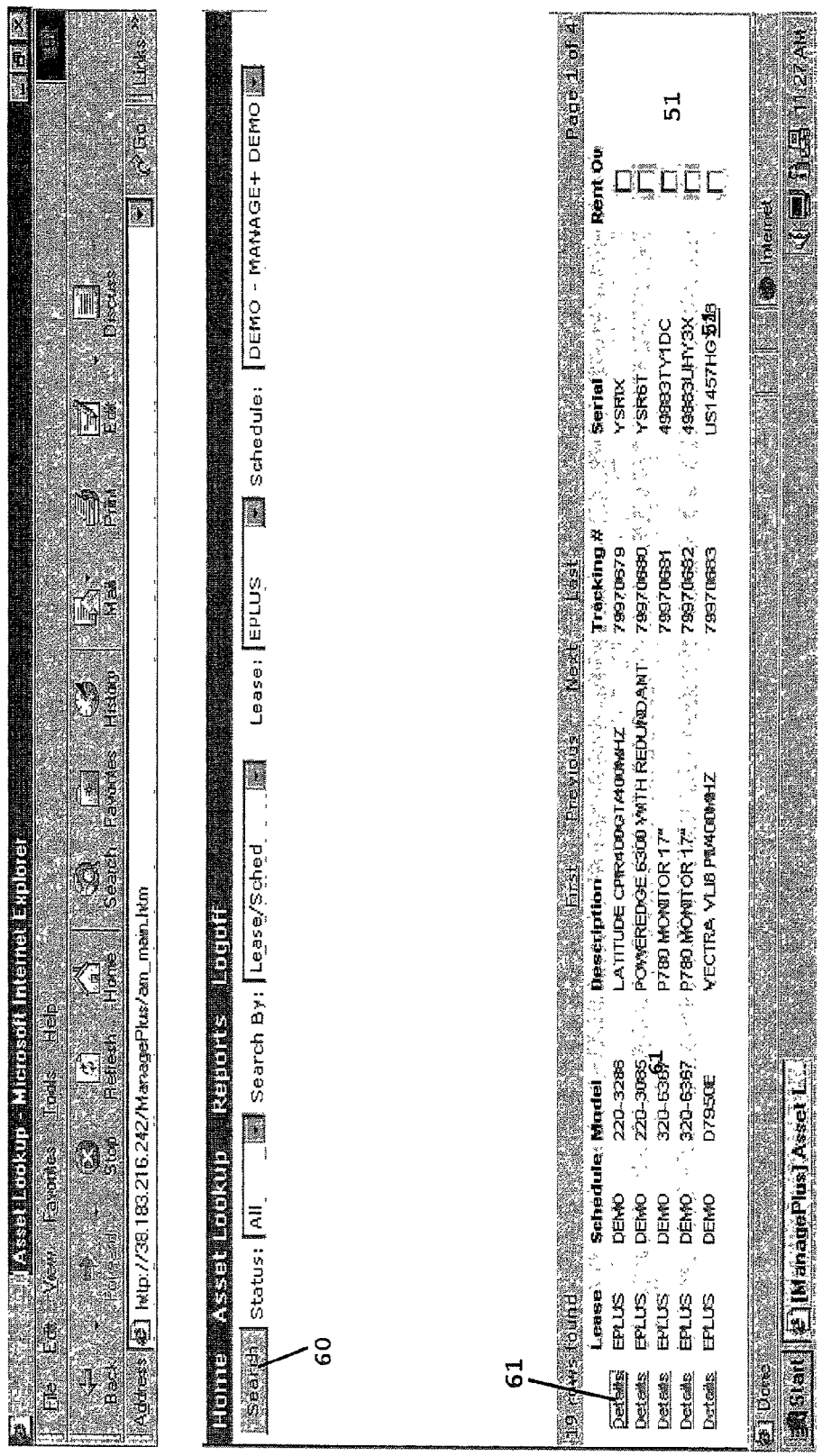
FIG. 6 is an exemplary display of selected assets in the lower half of a screen.

The Asset Lookup 60 feature enables a user not only to search for an asset 61, but also to view a range of detailed information about the selected asset. Assets are displayed in the lower half 51 of the screen, as illustrated in FIG. 6, and in a preferred embodiment an asset is selected in the lower half for further display via the tabs, which in a preferred embodiment are contained in a row across the top half of the screen, see also FIG. 6.

ASSET—The Asset tab 70 displays detailed asset information for the asset selected 61 in the bottom half 51 of the Asset Information Screen. This tab displays the following fields in a preferred embodiment, illustrated in FIG. 7:

Serial Number—the manufacturer serial number of the asset;
Tracking Number—the unique identification number a partner assigns to an asset to track its use in the partner's organization;
Purchase Order—the purchase order number the asset is attached to;
Manufacturer—the name of the manufacturer of the asset;
Model Number—the manufacturer's model number of the asset;
Vendor—the vendor from which the asset was purchased;
Description—a brief description of the asset;
Category—in a preferred embodiment the system assigned categories to assets for purposes of tracking assets, e.g., PC, Monitor, Server, Storage;
Billing Code—an identification code a partner assigns to an asset typically for accounting or budgeting purposes;
Order Date—the date the asset was ordered,
Equipment Status—the status of the asset, as described above;
N/U/B—whether the asset is new, used or both. An asset can be both when the asset is new, but has a used option, or vice versa;
Ship Date—the date the vendor shipped the asset;
Install Date—the scheduled installation date of the asset;
Pool ID—the pooling identification number the system assigns to an asset when the schedule of the asset if completed. The pooling ID identifies how the system will route an asset after the schedule of the asset is completed;
Hard Cost—whether the asset is a hard or a soft cost. Typically, an asset is a hard cost, however, in some cases an asset is a soft cost, such as software not associated with a leased asset;
Leased—the lease identification number of the asset;
Tax Exempt—whether any part of the cost of the asset is tax exempt;
Feature-1—any information the system adds about the asset during the acquisition period. This field may be blank or display a brief description or short note about the asset. Once a schedule is activated, this field is blank;
Lease—the lease identification number of the asset;
Schedule—the schedule identification number of the asset;
Feature-2—any information the system adds about the asset during the acquisition period. This field may be blank or display a brief description or short note about the asset. Once a schedule is activated, this field is blank;
Begin Date—the start date of the schedule the asset is attached to;
End Date—the end date of the schedule the asset is attached to;
Term—the term, in months, of the schedule the asset is attached to; and
Remain—the months remaining of the term of the schedule the asset is attached to.

OPTION—Displays any options associated with the asset selected 61 in the bottom half 51 of the Asset Information Screen. This tab 80 displays the following fields in a preferred embodiment, illustrated in FIG. 8:

Quantity—the option quantity;
Manufacturer—the name of the manufacturer of the option;
Model Number—the manufacturer model number of the option;
Description—a brief description of the option;
Serial Number—the manufacturer serial number of the option;
Tracking ID—the identification number a partner organization has assigned to the option to track its use in the partner's organization;
List Price—the list price of the option. This field is not used in a preferred embodiment;
Cost—the hard cost of the option;
Maintenance Cost—the maintenance cost, to date, of the option; and
Leased—whether the partner organization has leased the option.

LOCATION—Displays the installation and billing locations of the asset selected 61 in the bottom half 51 of the Asset Information Screen. This tab 90 displays the following fields in a preferred embodiment, illustrated in FIG. 9:
- Company—the company name of the installation/billing location;
- Address, City, St., ZIP—the company address of the installation/billing location;
- County—the county of the installation/billing location.

Figure 10:
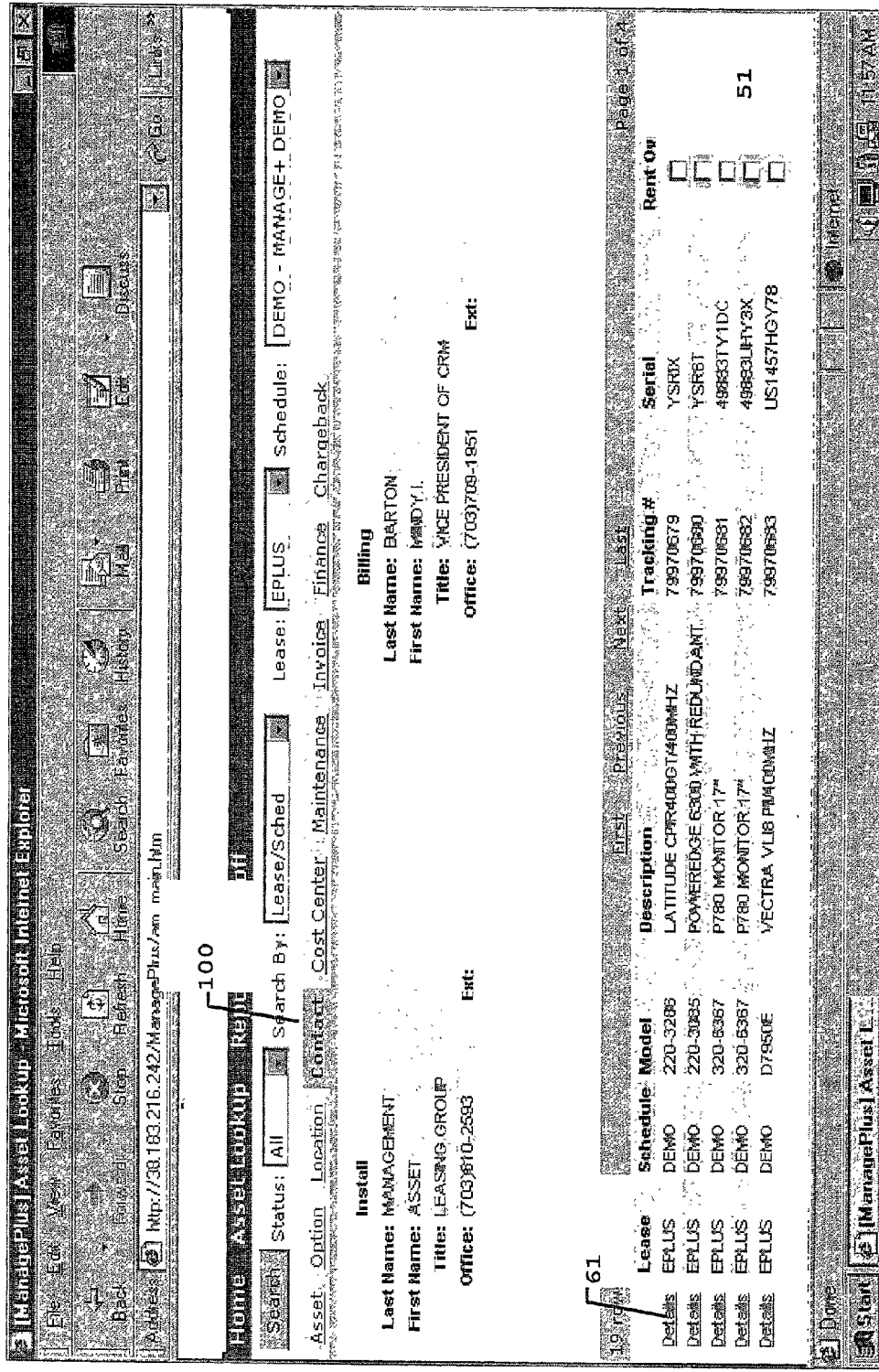
FIG. 10 is an exemplary display resulting from the selection of the Contacts Tab.

CONTACTS—Displays the contacts of the asset selected 61 in the bottom half 51 of the Asset Information Screen. This tab 100 displays the following fields in a preferred embodiment, illustrated in FIG. 10:
- Last Name—contact's last name;
- First Name—contact's first name;
- Title—contact's title; and
- Office, Ext.—contact's telephone number.

Figure 11:
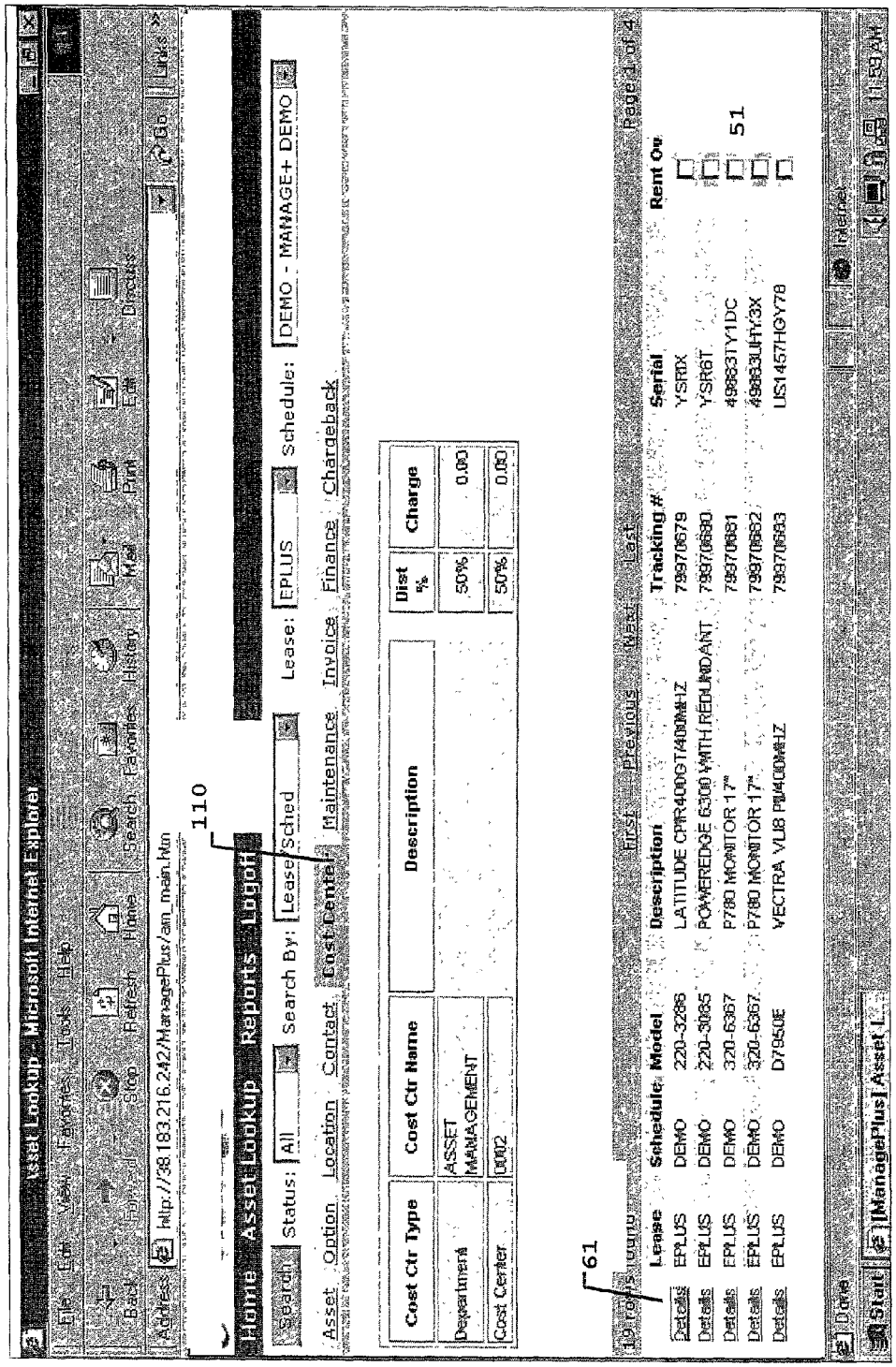
FIG. 11 is an exemplary display resulting from the selection of the Cost Center Tab.

COST CENTER—Displays the cost centers of the asset selected 61 in the bottom half 51 of the Asset Information Screen. This tab 110 displays the following fields in a preferred embodiment, illustrated in FIG. 11:
- Cost Center Type—the cost center type of the asset. In a preferred embodiment these are supplied by the system to enable partners to group cost centers by type. Available cost center types are Cost Center, Department, Mail Code, Region, Project, SSN, or Order Types;
- Cost Center Name—name of the cost center of the asset;
- Description—a brief description of the cost center;
- Distribution Percentage—the percentage of the cost of the asset charged to the cost center;
- Charge—the amount charged to the cost center, which is the distributed percentage of the total cost of the asset.

MAINTENANCE—Displays the warranty and maintenance information for the asset selected 61 in the bottom half 51 of the Asset Information Screen. This tab 120 displays the following fields in a preferred embodiment, illustrated in FIG. 12:
- Warranty End Date—end date of the warranty of the asset;
- Warranty Letter Date—the date the partner organization received the warranty letter for the asset. In some cases, the warranty letter date is the effective date of the warranty for the asset;
- Warranty Period—the period of the warranty, which is the period from the warranty letter date to the warranty end date;
- Maintenance Rent—the maintenance rent cost charged for the asset;
- Maintenance Cost—the total maintenance costs charged for the asset;
- Date—the date the maintenance was completed for the asset;
- Maintenance Description—a brief description of the maintenance completed; and
- Charge Amount—the amount charged for the completed maintenance.

INVOICE—Displays the invoice information for the asset selected 61 in the bottom half 51 of the Asset Information Screen.

Figure 13:
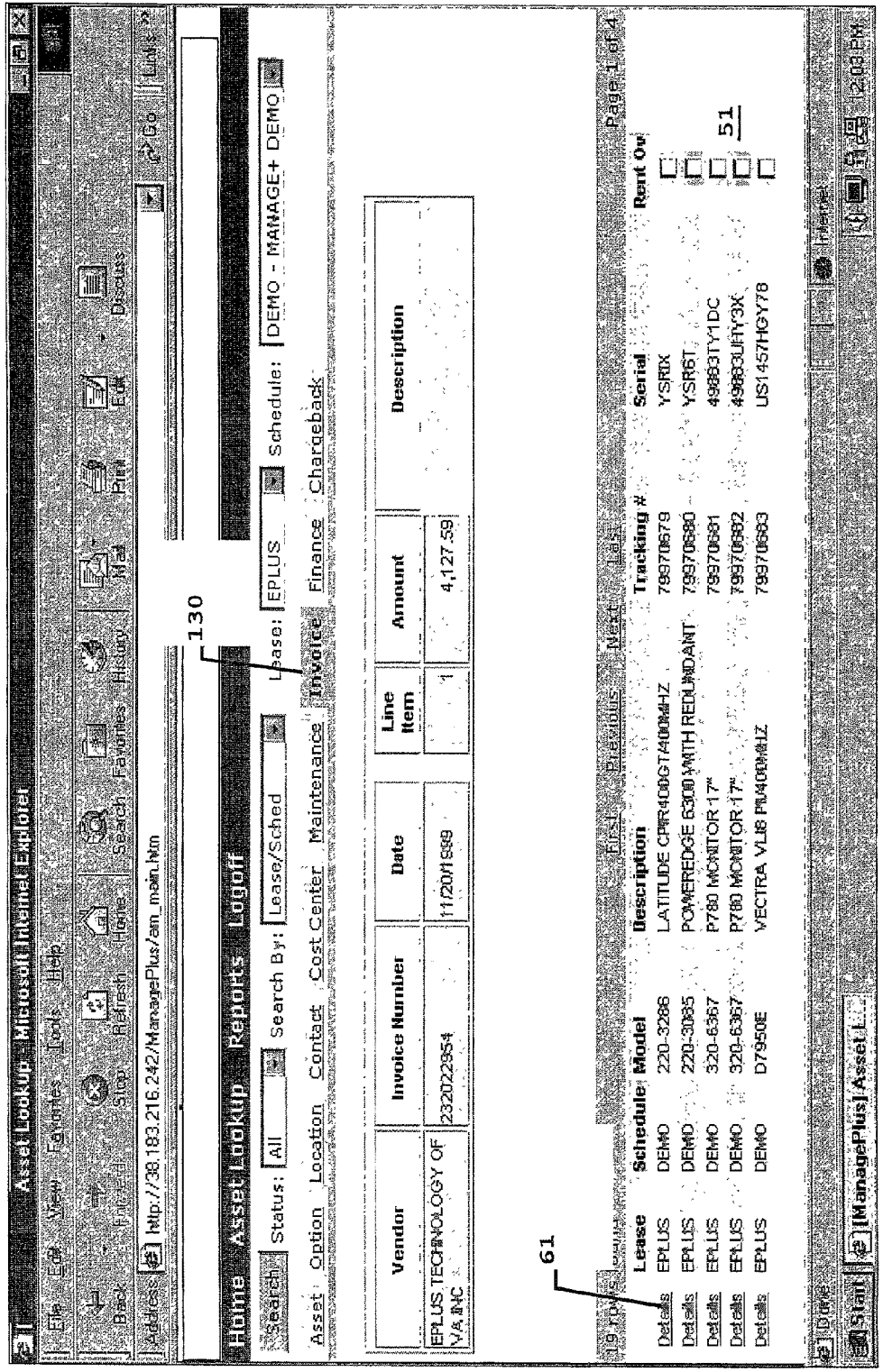
FIG. 13 is an exemplary display resulting from the selection of the Invoice Tab.

This tab 130 displays the following fields in a preferred embodiment, illustrated in FIG. 13:
- Vendor—the vendor from which the asset or option was purchased;
- Invoice Number—the vendor invoice number;
- Date—the date of the invoice;
- Line Item—the invoice line item of the asset or option;
- Amount—the line item amount due for the asset or option; and
- Description—a brief description of the asset or option.

Figure 14:
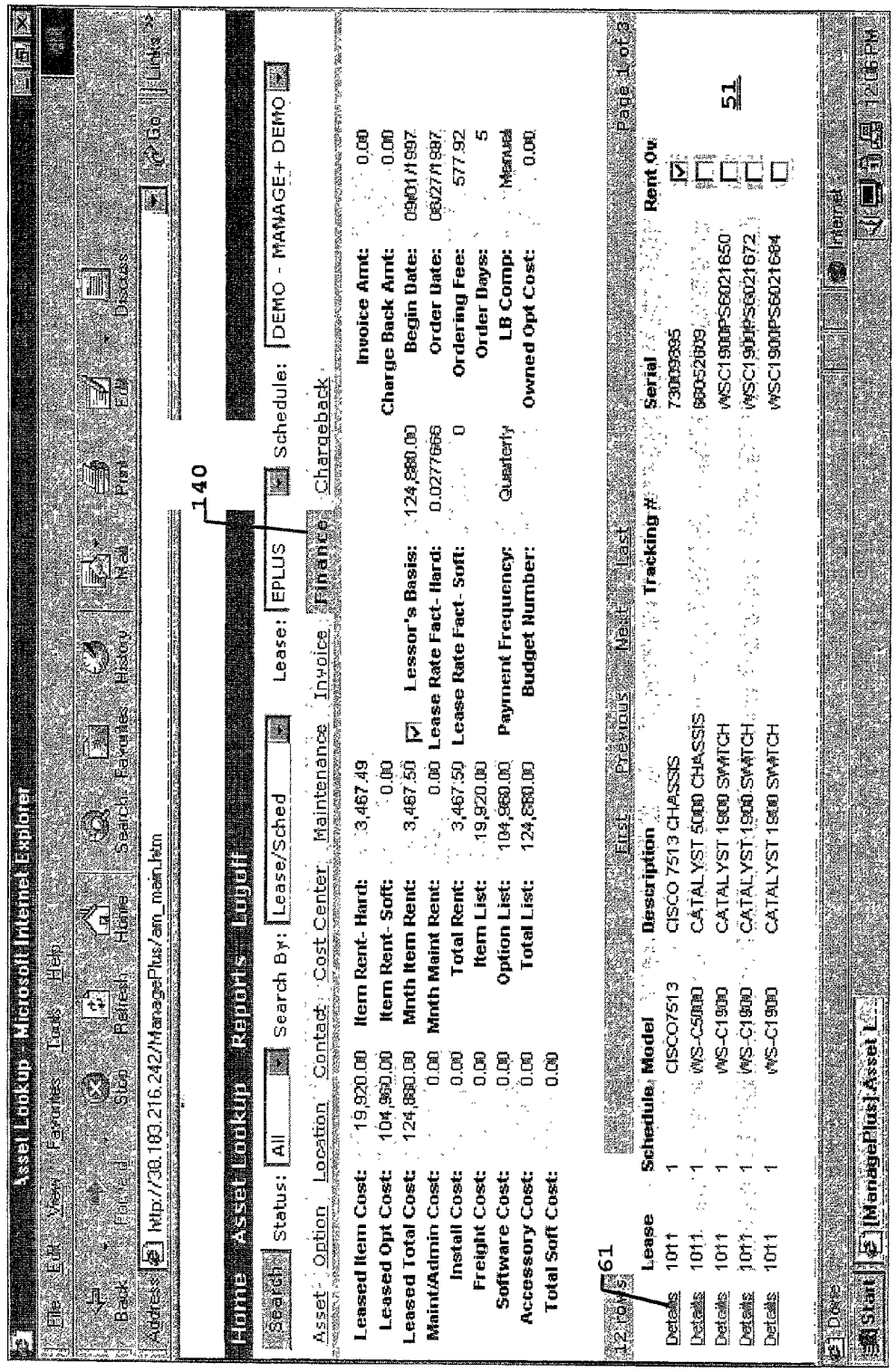
FIG. 14 is an exemplary display resulting from the selection of the Finance Tab.

FINANCE—Displays the financial information for the asset selected 61 in the bottom half 51 of the Asset Information Screen. This tab 140 displays the following fields in a preferred embodiment, illustrated in FIG. 14:
- Leased Item Cost—the lease cost of the asset;
- Leased Option Cost—the lease cost of any asset options;
- Leased Total Costs—the total lease cost of the asset and its options;
- Maintenance/Administrative Cost—the maintenance and administrative cost of the asset included in the schedule. If none, the field is blank and the cost appears as a charge back amount;
- Installation Cost—the installation cost of the asset included in the schedule. If none, the field is blank and the cost appears as a charge back amount;
- Freight Cost—the freight cost of the asset included in the schedule. If none, the field is blank and the cost appears as a charge back amount;
- Software Cost—the software cost of the asset included in the schedule. If none, the field is blank and the cost appears as a charge back amount;
- Accessory Cost—the accessory cost of the asset included in the schedule. If none, the field is blank and the cost appears as a charge back amount;
- Total Soft Costs—the total of Maintenance/Administrative, Installation, Freight, Accessory costs. The soft costs are the costs associated with an asset that have been determined to have negligible value at the end of a lease;
- Item Rent-Hard—the rent charged for the asset and any options;
- Item Rent-Soft—the rent charged for any soft cost items associated with the asset;
- Monthly Item Rent—the monthly rent due for both the hard and soft rent items. If the monthly rent of the asset has been modified, a check mark appears in the checkbox next to the field;
- Monthly Maintenance Rent—the monthly maintenance rent charged for the asset;
- Total Rent—the total rent due, which is the sum of the monthly item and maintenance rent costs;
- Item List—the Leased Item Cost of the asset;
- Option List—the leased Option Cost of the asset;
- Total List—the total Leased Costs of the asset; Lessor's Basis—the sum of the total Leased Costs and Total Soft Costs of the asset;
- Lease Rate Factor-Hard—the lease rate factor calculated for the hard costs of the schedule of the selected asset;
- Lease Rate Factor-Soft—the lease rate factor calculated for the soft costs of the schedule of the selected asset;
- Payment Frequency—how often the lease payments for the schedule of the selected asset are due;
- Budget Number—the budget number assigned to the asset;
- Invoice Amount—the invoice amount of the asset;
- Charge Back Amount—the total charge back amount rebilled to a partner organization. The Charge back tab displays an itemized list of the charge backs.
- Begin Date—the date the schedule of the asset begins.
- Order Date—the date the partner organization received the asset. This date is prior to the start date of the schedule of the selected asset. Typically, this is the date the partner organization signed the Certificate of Acceptance for the asset;
- Ordering Fee—the amount charged the partner organization for the asset from the order date to the begin date of the schedule. This amount is calculated by multiplying the daily asset rent fee by the order days.

Order Days—the number of days from the order date to the begin date of the schedule of the selected asset.

LB Comp—one of four Lessor's Basis Computed codes. The LB Comp codes indicate how the Lessor's Basis was calculated for an asset; and Owned Op Cost—the total cost of any options owned by the partner organization for the selected asset.

Figure 15:
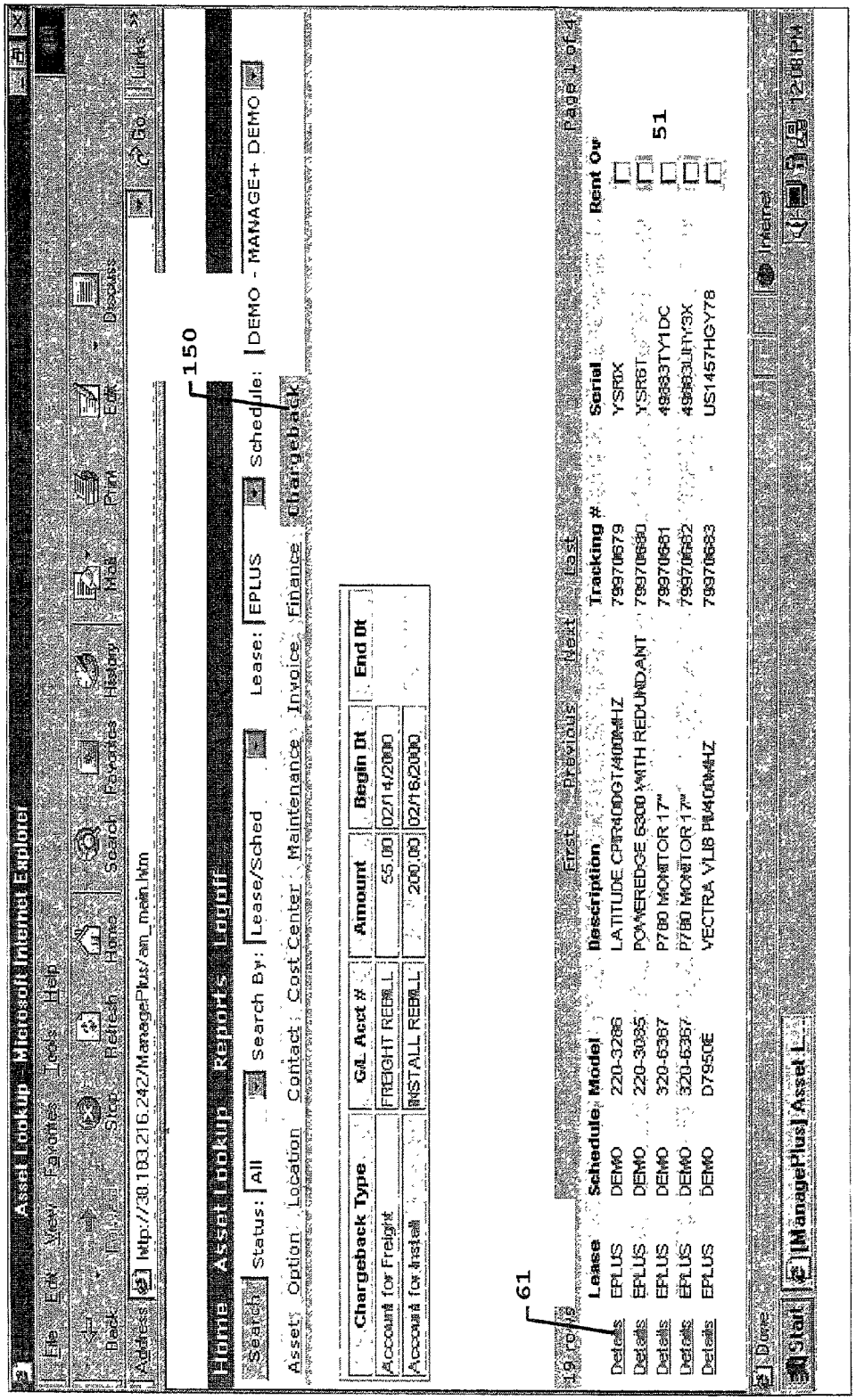
FIG. 15 is an exemplary display resulting from the selection of the Charge Back Tab.

CHARGE BACK—Displays the charge back information for the asset selected 61 in the bottom half 51 of the Asset Information Screen. This tab 150 displays the following fields in a preferred embodiment, illustrated in FIG. 15:

Charge back Type—the charge back type code of the asset;

G/L Account #—the General Ledger account the partner organization uses to process the charge back amount;

Amount—the amount of the charge back item;

Begin Date—for a one-time charge back amount, displays the date the system entered the charge back amount into the system database;

End Date—the end date of the period for which the amount is charged. In a preferred embodiment of the present invention, this field is not used.

REPORTS

Figure 3:
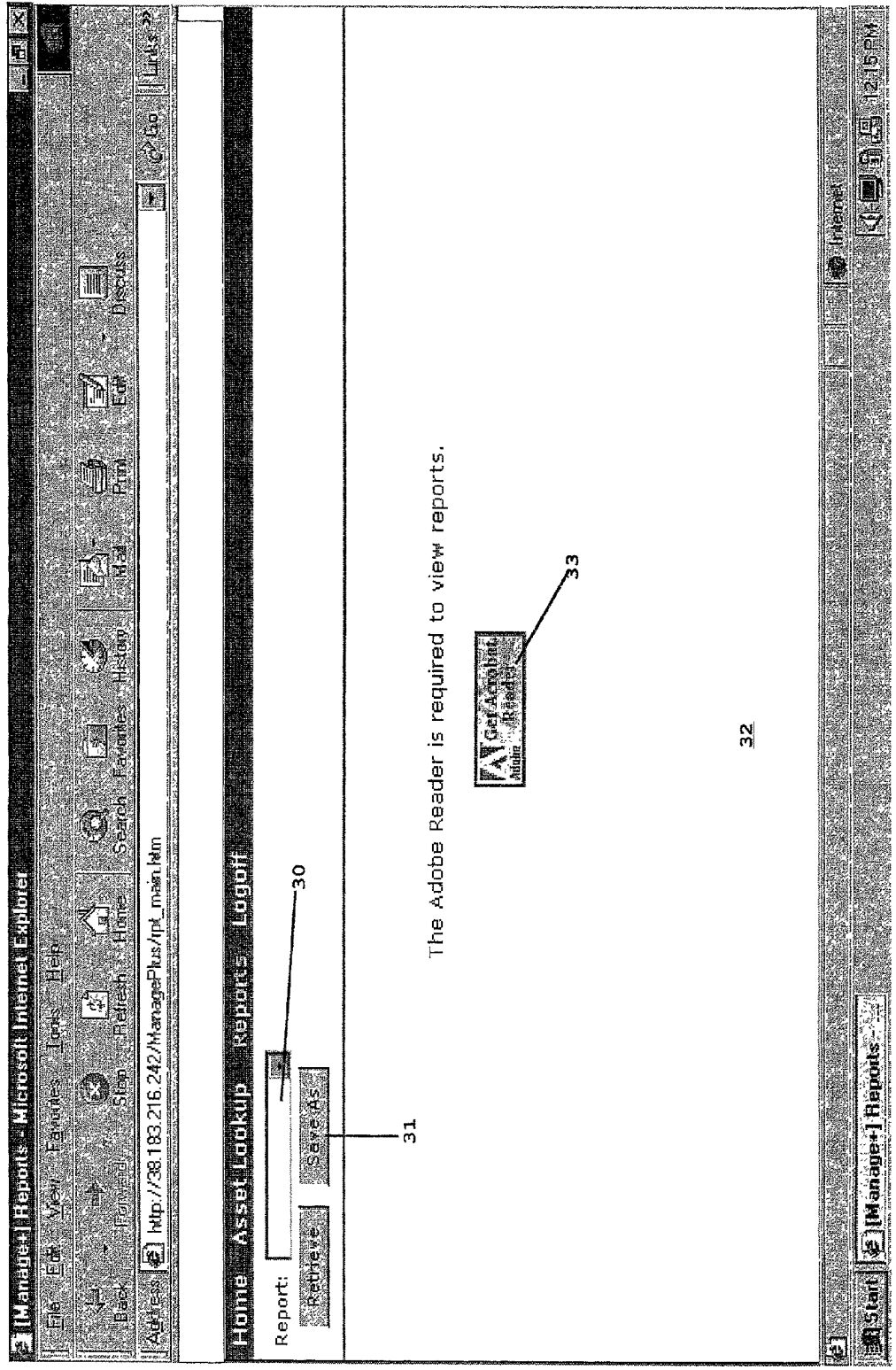
FIG. 3 is an exemplary report specification screen.

In the preferred embodiment, selecting the Reports from the main menu bar causes the display of the Reports Screen, illustrated in FIG. 3. The Reports Screen is the central screen of the Reports feature of the present invention, providing functionality which allows a user to produce a range of reports that enable a user to retrieve data from the asset information database of the preferred embodiment of the present invention.

The Reports Screen comprises the Report feature 30, which is at the top of the screen in a preferred embodiment; options for producing and saving a report 31; and, the display area in the middle of the screen 32. In a preferred embodiment, the display area includes a link 33 to Adobe's Web site for downloading Acrobat Reader, free software that is required to view reports produced by the present invention.

Reports

The Reports feature of a preferred embodiment of the present invention provides a user with a range of asset information management reports, from the standard reports to any customized reports created for the partner's organization. The standard reports of a preferred embodiment include:

PURCHASE ORDER—allows an authorized user to view asset detail information organized by purchase order number, as illustrated in FIG. 17. The report is available in the Summary, Item Level, and Item Level with Options report formats. The report title 170 and the organization's master lease number 171 appear at the top of the report. The asset detail information listed includes the quantity 172, manufacturer 173, model 174, description 175, equipment cost 176, and quarterly lease payment 177 of each listed asset. The report also lists the total purchased asset; total equipment cost; total quarterly lease payment by purchase order; and, these totals for all selected purchase orders.

COST CENTER—allows an authorized user to view asset detail information organized by cost center, as illustrated in FIG. 18. The report is available in the Summary or Item Level formats. The report title 180 and the organization's master lease number 181 appear at the top of the report. The asset detail information listed includes the quantity 182, manufacturer 183, model 184, description 185, equipment cost 186, management fee 187, and quarterly lease payment 188 for each listed asset. The report also lists the total items purchased, total equipment cost, total management fee, and total quarterly lease payment for each cost center, and these totals for all selected cost centers.

Figure 19:
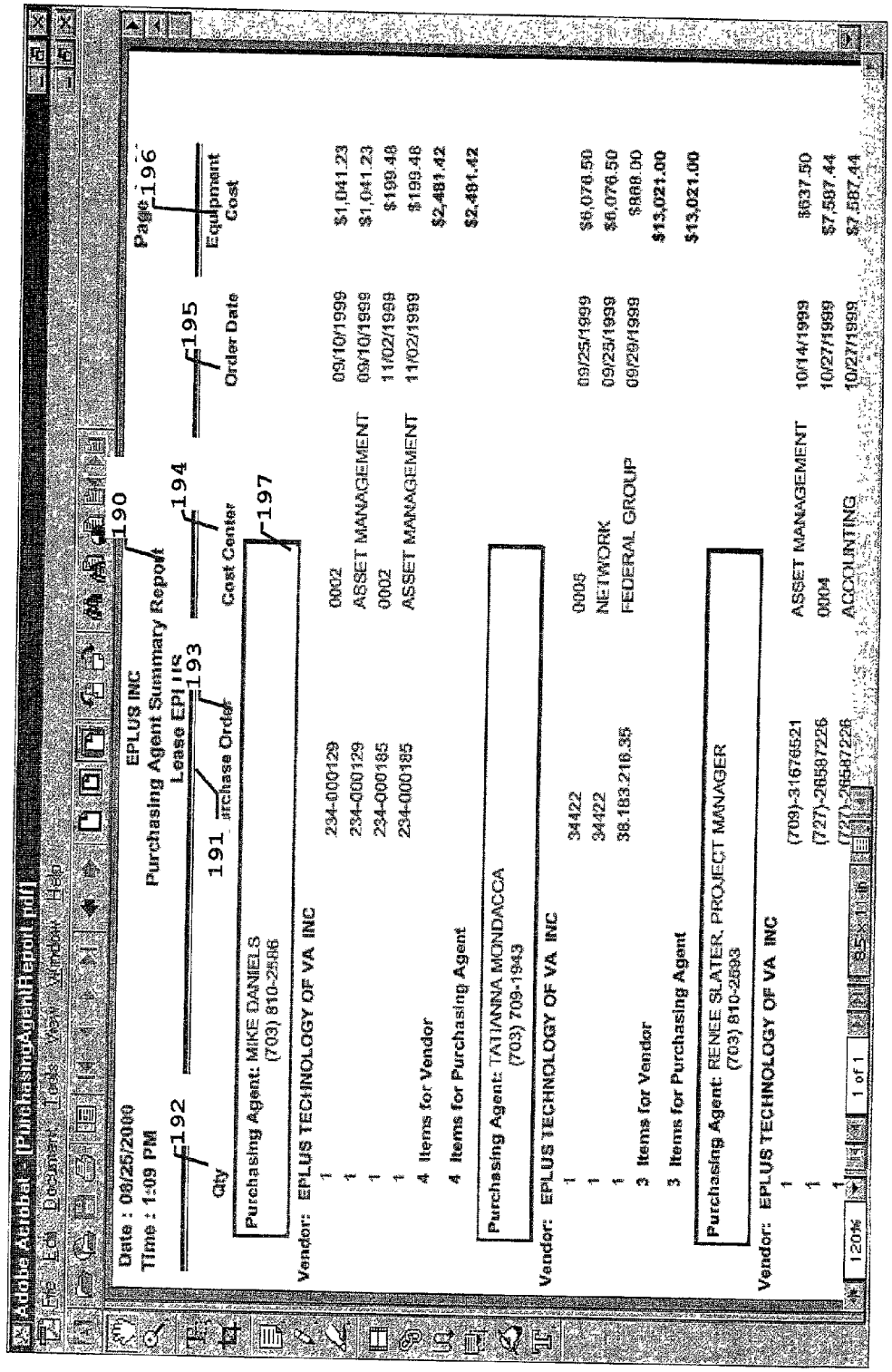
FIG. 19 is an exemplary Purchasing Agent Report in summary format.

PURCHASING AGENT—allows an authorized user to view asset detail information organized by purchasing agent, as illustrated in FIG. 19. The report is available in the Summary or Item Level formats. The report title 190 and the organization's master lease number 191 appear at the top of the report. The asset detail information listed includes the quantity 192, purchase order number 193, cost center 194, order date 195, and equipment cost 196 for each listed asset. For each purchasing agent, the report lists asset detail by vendor. The report also lists the total items purchased and total equipment cost for each vendor, for each purchasing agent 197, and for all purchasing agents.

Figure 20:
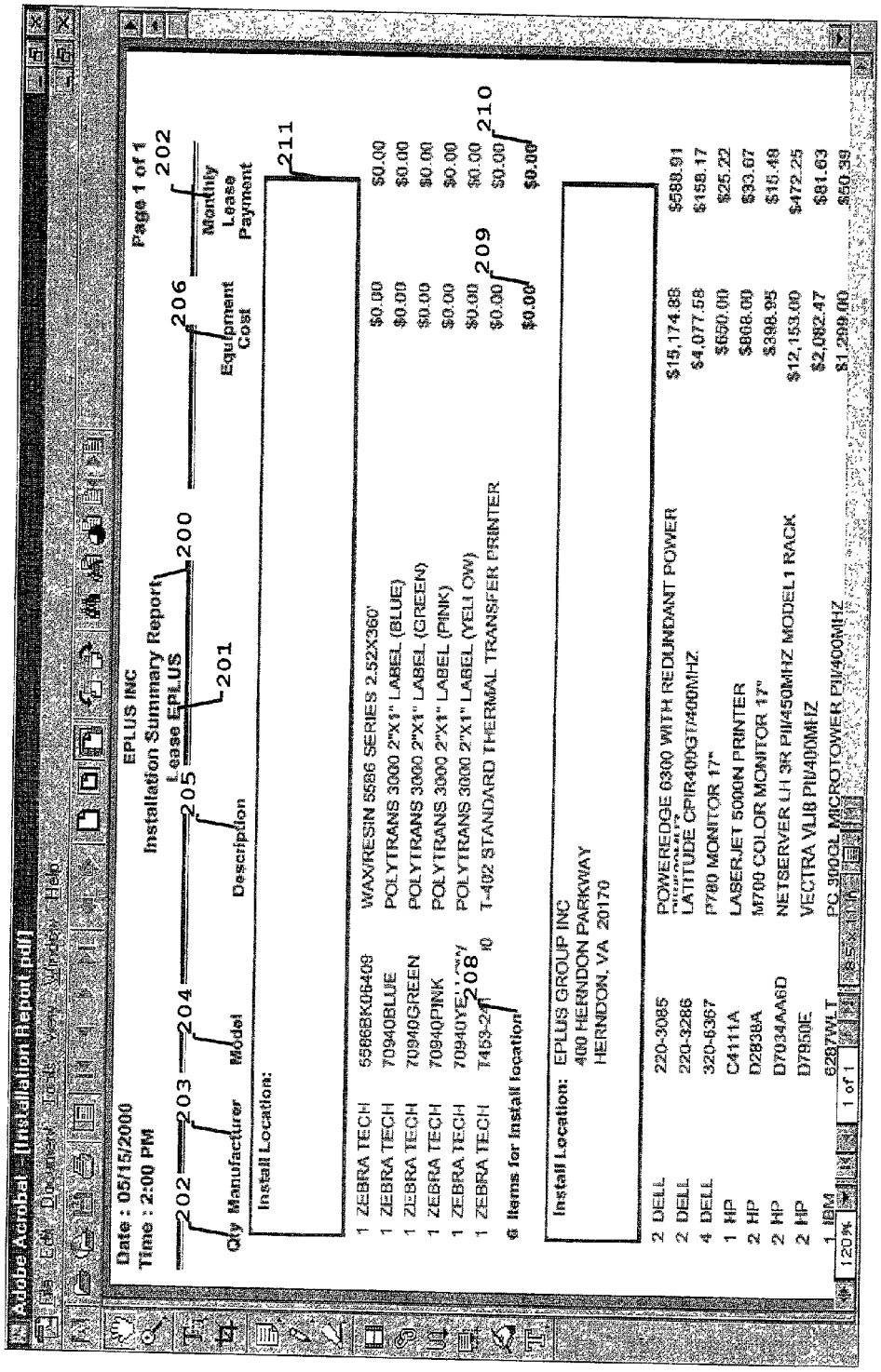
FIG. 20 is an exemplary Installation Report in summary format.

INSTALLATION—allows an authorized user to view asset detail information organized by installation location, as illustrated in FIG. 20. The report is available in the Summary or Item Level formats. The report title 200 and the organization's master lease number 201 appear at the top of the report. The asset detail information listed includes the quantity 202, manufacturer 203, model 204, description 205, equipment cost 206, and quarterly lease payment 207 for each listed asset. The report also lists the total items purchased 208, total equipment cost 209, and total quarterly lease payment 210 for each installation location 211, and these totals for all listed locations.

Figure 21:
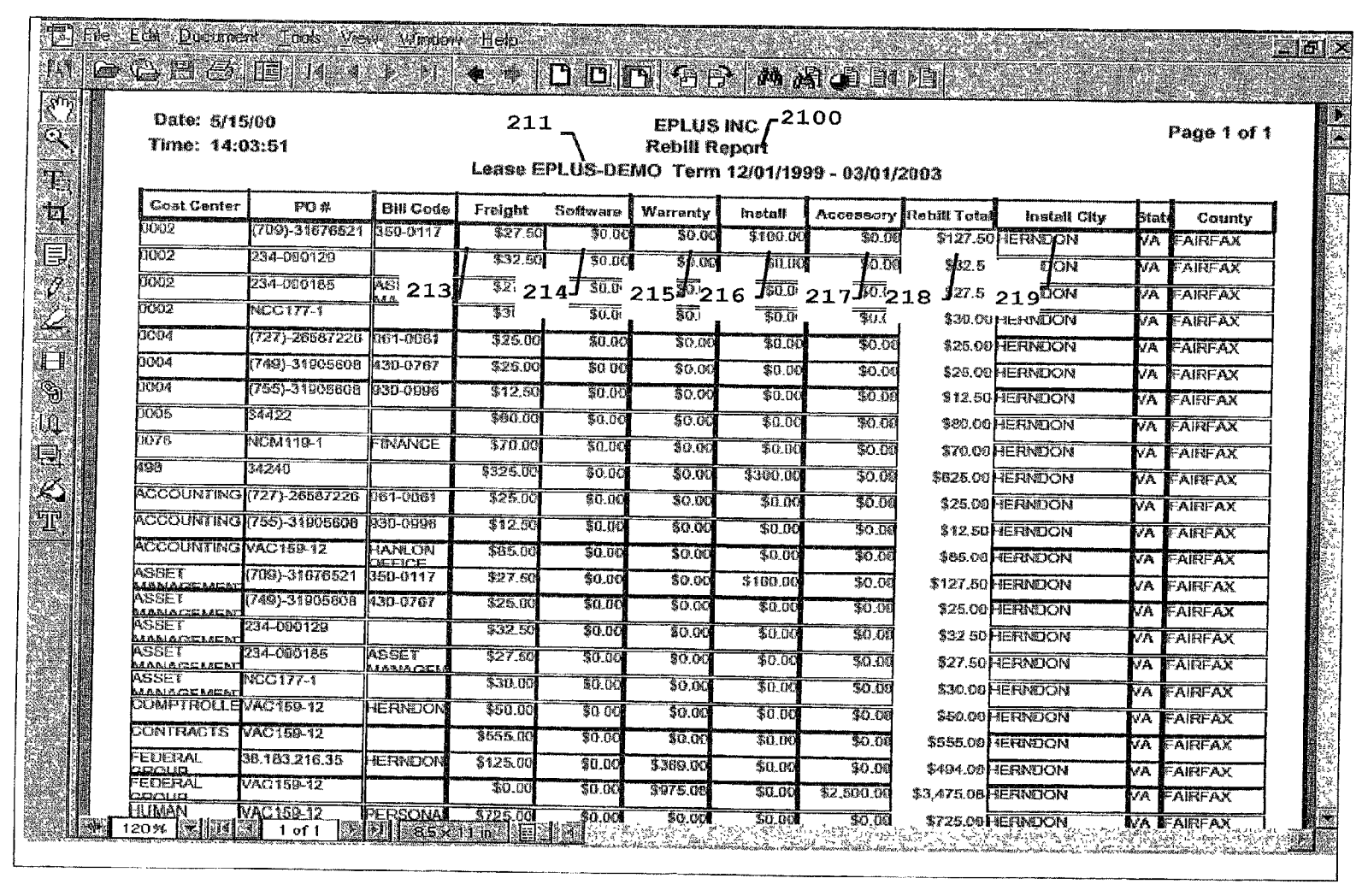

REBILL—allows an authorized user to view financial detail information for the charge back amounts of the selected schedule, as illustrated in FIG. 21. The report is available in the Summary or Group by Cost center report formats. The report title 2100, the organization's master lease number 211, and the term of the organization's lease 212 appear at the top of the report. For each cost center and purchase order combination, the report lists the charge back amounts—freight 213, software 214, warranty 215, installation 216, and accessory costs 217—of the applicable assets; the total charge back amount 218, and the installation location 219 of the assets on the purchase order. The report also lists the total charge back amounts for the listed cost center and purchase order combinations, and the billing address of the listed purchase orders.

STATUS—allows an authorized user to view the status of an organization's master lease, as illustrated in FIG. 22. The report title 220, the organization's master lease number 221, and the term 222 of the organization's lease appear at the top of the report. For each purchase order the report lists the equipment cost 223, date of acceptance 24, ship date 225, order date 226, and whether the shipment was a partial shipment 227. In addition, the report lists totals 228: the total equipment cost; the total by equipment type; the total soft costs; and any remaining product costs of the organization's lease.

SOFT COSTS—allows an authorized user to view the soft costs of an organization's master lease, as illustrated in FIG. 23. Soft costs refer to the costs of a lease that have been determined to have a negligible value at the end of the lease. Soft costs include the maintenance, installation, freight, software, and accessory costs of the assets of a lease. The report title 230, the organization's master lease number 231, and the term of the organization's lease 232 appear at the top of the report. For each cost center and purchase order combination, the report lists the soft costs 233, freight 234, software 235, and accessory costs 236—of the applicable assets; the total soft costs 237, and the installation location 238 of the assets of each purchase order. The report also lists the total soft costs for the listed cost center and purchase order combinations, and the billing address of the listed purchase orders.

Figure 25:
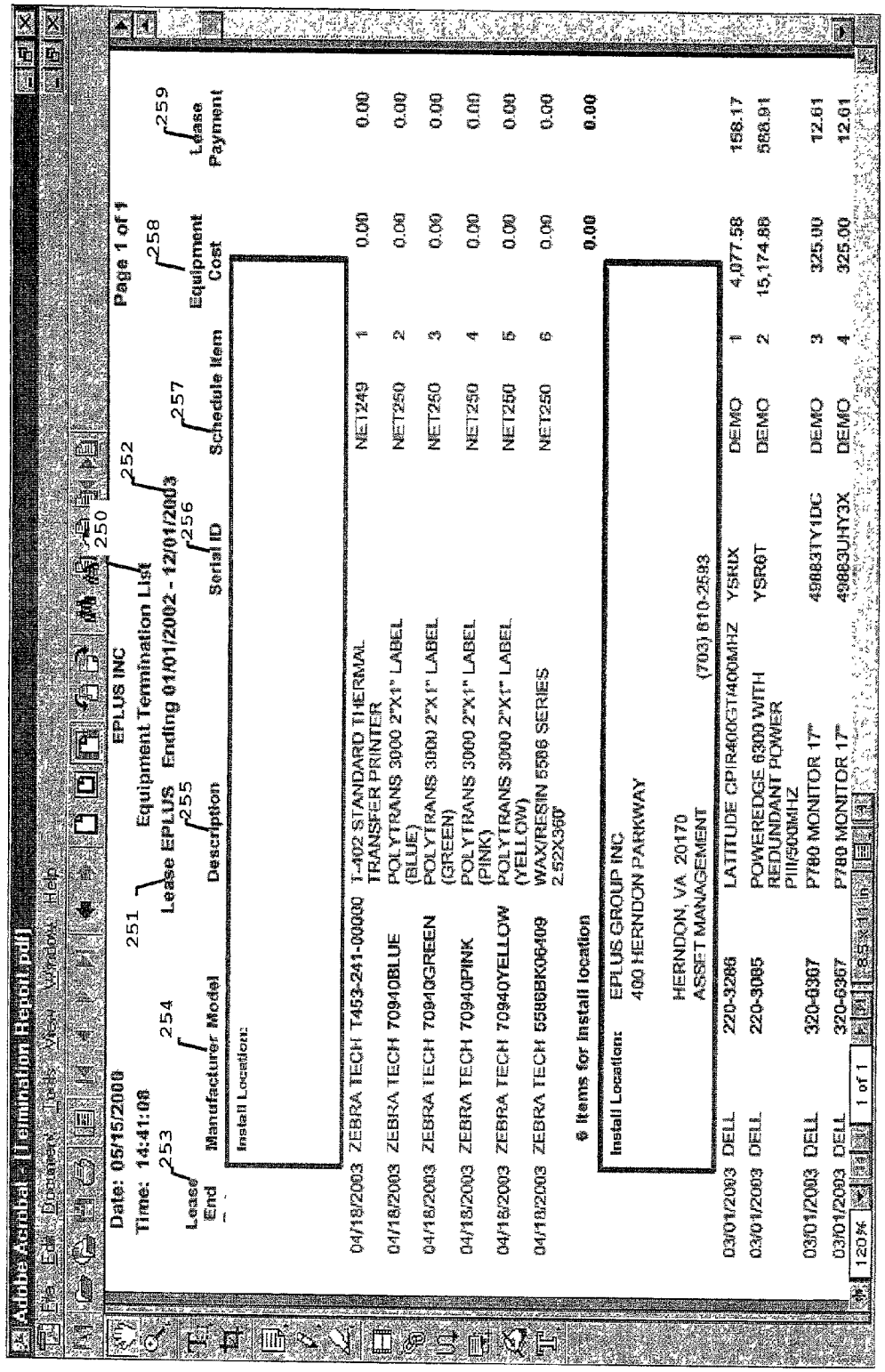
FIG. 25 is an exemplary Termination Report

LEASE SUMMARY—allows an authorized user to view a summary of the selected schedule, as illustrated in FIG. 24. The report title 240, the organization's master lease number 241, the selected schedule 242, the schedule date 243, lease term 244, acceptance date 245, payment frequency 246, and lease end date 247 appear at the top of the report. The summary information listed includes the master lease, installation and billing location, and financial information of the selected TERMINATION—allows an authorized user to view the assets of the schedules that end in the specified range of schedule end dates, as illustrated in FIG. 25. The report title 250, the organization's master lease number 251, and the specified schedule end date range 252 appear at the top of the report. For each asset of the selected schedules, the report lists the lease end date 253, manufacturer model number 254, description 255, manufacturer serial number 256, schedule item number 257, equipment cost 258 and lease payment 259.

Report Format Descriptions

In one preferred embodiment the Format drop-down menu in the Reports Screen enables a user to select the type of report to be produced:

Summary—this view lists identical assets once, with the quantity and amount fields for identical assets displaying the totals of the summarized assets;

Item Level—this view lists each asset, including identical assets, separately;

Item Level with Options—this view lists each asset, including identical assets and any asset options, separately;

Standard—this is the format of the Status, Soft Costs, Lease Summary, and Termination reports, and one of the two formats available for the Rebill report; and Group by Cost Center—this is the second of two formats available for the Rebill report and lists rebilling information by cost center and purchase order number combination, with re billing subtotals listed for each cost center.

Producing a Report

In a preferred embodiment, an authorized user follows the same procedure for producing a report:

Select the type of report from the Report drop-down menu;

Select the format of the report from Format drop-down menu;

Select the view of the report from the By drop-down menu;

Select the other options presented from their drop-down menus; and

Select Retrieve to produce the report.

Figure 26:
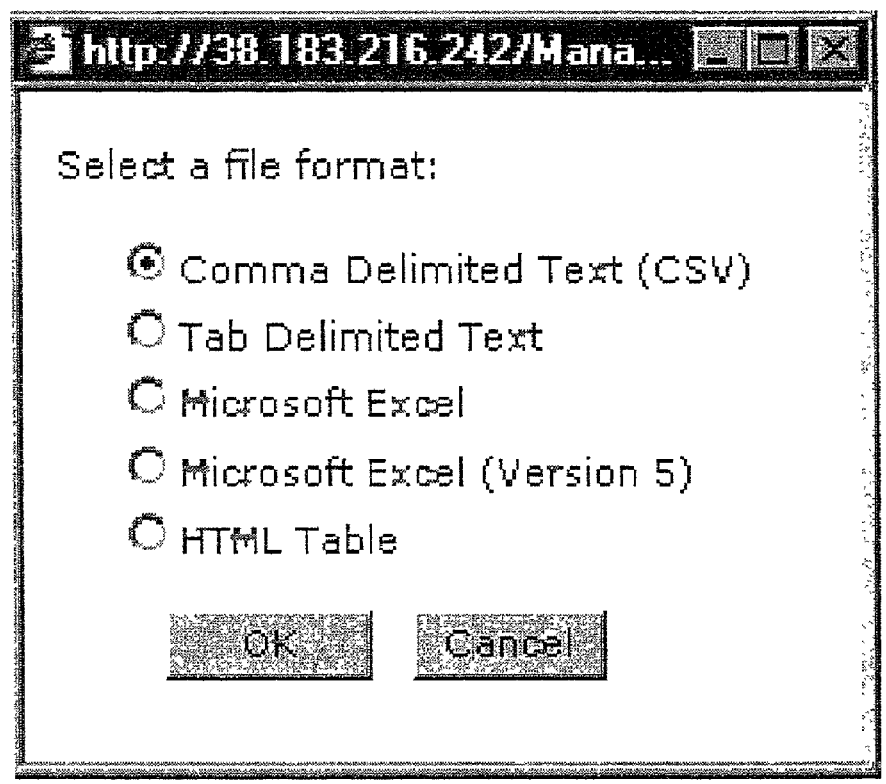
FIG. 26 illustrates the format options for saving report data in a file in a preferred embodiment.

After the report appears it can be viewed, saved to a file using the Save As options shown in FIG. 26, and printed.

Because many varying and different embodiments may be made within the scope of the inventive concepts herein taught, and because many modifications may be made in the embodiments herein detailed in accordance with the descriptive requirements of the law, it is to be understood that the details herein are to be interpreted as illustrative and not in a limiting sense. For example, in discussing Internet accessibility, this can be achieved in a variety of ways including wireless handheld devices, portable terminals, workstations, and any other devices or means which provides Internet access to the host for the system of the present invention.

We claim:

1. A system for asset information management, said system comprising:

a host system;

first computer input-output means;

at least one asset database within said host system for storing a plurality of asset information records and associated business rules for asset information management which extends across multiple enterprises and which intersect; and computer processing means within said host system for enabling:

i. to look up said asset information records according to both (1) said associated business rules and (2) search criteria, both of which being provided by said first computer input-output means, and to control said first input-output means for output of said looked up asset information records to at least one of a display, hard copy device, and first file, and ii. to select and format reports of said asset information records according to both (1) said associated business rules and (2) format and selection criteria, both of which being provided by said first computer input-output means, and to control said first input-output means for output of said selected and formatted asset information records to at least one of a display, hard copy device, and file.

2. The system according to claim 1, further comprising means at the host for specifying one of said looked up asset information records for creation of detailed asset information sets containing detailed asset information wherein each said set is associated with at least one selectable element identifying the type of detailed asset information said set contains so that any of looking up, selecting and formatting reports by said computer processing means is enabled with respect to each of said detailed asset information sets by selecting said at least one selectable element.

3. The system according to claim 1, wherein said first computer input-output means comprises at least one legacy system.

4. The system according to claim 1, further comprising:

at least one remote communications facility;

communications network means associated with said host system, said communications network means being controlled by said computer processing means to exchange data between said host computer system and said at least one remote communication facility;

second computer input-output means at said at least one remote communications facility to enable:

i. to provide search criteria to said computer processing means for look up of said asset information records according to said associated business rules, to output said looked up asset information records to at least one of a remote display, hard copy device, and file, and to download said host file of said looked up asset information records, ii. to provide selection criteria and report format specifications to said computer processing means for selection of said asset information records according to said associated business rules, to provide report format specifications to said computer processing means for formatting said selected asset information records according to said associated business rules, to output said formatted reports to at least one of a display, hard copy device, and file, and to download said host file of said formatted reports from host, and iii. to upload to said host to be stored in said at least one asset database, files of asset information records and said associated business rules for the assets.

5. The system according to claim 4, wherein said data exchanged comprises search criteria, selection criteria, report formats, looked up data, formatted reports and files.

6. The system according to claim 4, wherein: said at least one remote communications facility comprises a plurality of remote communications facilities associated with a plurality of supply chain partners; said host system comprises at least one centrally-located computer-based system; and said at least one asset database comprises asset information records and associated business rules for assets of each of said plurality of supply chain partners, such that said asset information records and associated business rules for assets of each of said plurality of supply chain partners are uploaded for storage in said at least one asset database and asset information records and associated business rules stored in said at least one asset database is adapted for display, reporting, and downloading in accordance with said associated business rules by each of said plurality of supply chain partners using said plurality of remote communications facilities.

7. The system according to claim 4, wherein: said host system and said at least one remote communications facility exchange said data through the Internet.

8. The system according to claim 7, wherein said computer input-output means employs a Web browser.

9. The system according to claim 4, further comprising means at the host for specifying one of said looked up asset information records for creation of detailed asset information sets containing detailed asset information wherein each said set has an associated tab identifying the type of detailed asset information said set contains so that any of looking up, selecting and formatting reports by said computer processing means is enabled with respect to each of said detailed asset information sets.

10. The system according to claim 4, wherein said at least one asset database comprises at least one relational asset database comprising a plurality of tables, each said table having a plurality of information fields for storage of asset information of a prespecified type and each of said plurality of information fields having associated business rules.

11. The system according to claim 4, wherein said first computer input-output means and said second computer input-output means comprises at least one legacy system.

12. The system according to claim 11, wherein: said at least one remote communications facility comprises a plurality of remote communications facilities associated with a plurality of supply chain partners; and said at least one asset database comprises asset information records and associated business rules for assets of each of said plurality of supply chain partners, such that said asset information records and associated business rules for assets of each of said plurality of supply chain partners are uploaded for storage in said at least one asset database from at least said at least one legacy system and asset information records and associated business rules stored in said at least one asset database is adapted for at least one of display, selection and reporting, and for downloading in accordance with said associated business rules to at least said at least one legacy system by each of said plurality of supply chain partners using said plurality of remote communications facilities.

13. A method for asset information management, said method comprising the steps of:
providing a host system;
maintaining at least one asset database at the host of a plurality of asset information records and associated business rules which extends across multiple enterprises and which intersect;
providing search criteria and report selection and formatting specifications; for provided search, performing the steps of:
looking up asset information records in the at least one maintained asset database based on said provided search criteria and said associated business rules;
outputting said looked up asset information records to at least one of a display, hard copy device and file; for provided report selection and formatting specifications, performing the steps of:
selecting asset information records in the at least one maintained asset database based on said provided report selection criteria and said associated business rules;
formatting said selected asset information records according to said provided report formatting specifications and said associated business rules;
outputting said formatted reports to at least one of a display, hard copy device, and file.

14. The method according to claim 13, wherein said at least one maintained asset database is a relational asset database having asset information and business rules stored in a plurality of tables, each said plurality of tables having a plurality of information fields for storage of asset information and associated business rules of a prespecified type.

15. The method according to claim 14, further comprising the steps of: providing at least one remote communications facility; providing communications network means connected to said host and to said at least one remote communications facility; providing search criteria received from said at least one remote communications facility over said communications network means; providing report selection and formatting specifications received from said at least one remote communications facility over said communications network means; transmitting said looked up asset information records over said communications network means to said at least one remote communications facility for output; and transmitting said formatted reports over said communications network means to said at least one remote communications facility for output.

16. The method according to claim 15, wherein said communications network means is the Internet.

17. The method according to claim 16, wherein said at least one remote communications facility employs a Web browser.

18. The method according to claim 15, further comprising the steps of: providing a plurality of said at least one remote communications facility for access by a plurality of supply chain partners; and maintaining in said at least one asset database at said host a plurality of asset information records and associated business rules for assets of each of said plurality of supply chain partners.

19. The method according to claim 15, further comprising the steps of: providing at least one legacy system having a plurality of legacy asset information records and associated business rules at said at least one remote communications facility; uploading at least one of said plurality of legacy asset information records and associated business rules from said at least one legacy system to said maintained at least one asset database over said communications network; and downloading at least one of said plurality of asset information and associated business rules of said maintained at least one asset database to said at least one legacy system over said communications network.

20. The method according to claim 19, wherein said at least one legacy system comprises at least a plurality of supply chain partner systems.

21. The method according to claim 20, wherein said communications network means is the Internet.

22. The method according to claim 21, wherein said at least one remote communications facility employs a Web browser.

* * * * *